(12) United States Patent
Hankins et al.

(10) Patent No.: US 10,880,162 B1
(45) Date of Patent: Dec. 29, 2020

(54) LINKING LOGICAL BROADCAST DOMAINS

(71) Applicant: Cradlepoint, Inc., Boise, ID (US)

(72) Inventors: Scott Andrew Hankins, Cupertino, CA (US); Andrew John Mastracci, Kelowna (CA); Craig Wesley Elliott, Los Gatos, CA (US)

(73) Assignee: Cradlepoint, Inc., Boise, ID (US)

( * ) Notice: Subject to any disclaimer, the term of this patent is extended or adjusted under 35 U.S.C. 154(b) by 0 days.

(21) Appl. No.: 13/675,552

(22) Filed: Nov. 13, 2012

Related U.S. Application Data

(63) Continuation-in-part of application No. 13/543,729, filed on Jul. 6, 2012, now Pat. No. 9,118,495.

(51) Int. Cl.
*H04L 12/24* (2006.01)

(52) U.S. Cl.
CPC ................. *H04L 41/0813* (2013.01)

(58) Field of Classification Search
CPC ... H04L 67/025; H04L 67/322; H04L 69/329; H04L 69/18; H04L 69/24; H04L 67/125; H04L 49/15; H04W 4/005; H04W 4/14
USPC .................................................. 370/356–503
See application file for complete search history.

(56) References Cited

U.S. PATENT DOCUMENTS

| | | | |
|---|---|---|---|
| 5,548,646 A | 8/1996 | Aziz et al. | |
| 5,968,126 A | 10/1999 | Ekstrom | |
| 6,041,166 A | 3/2000 | Hart | |
| 6,055,568 A | 4/2000 | Adams | |
| 6,195,347 B1 | 2/2001 | Sehgal | |
| 6,269,404 B1 | 7/2001 | Hart | |
| 6,442,169 B1 | 8/2002 | Lewis | |
| 6,457,061 B1 | 9/2002 | Bal et al. | |
| 6,487,600 B1 | 11/2002 | Lynch | |
| 6,516,417 B1 | 2/2003 | Pegrum | |
| 6,594,272 B1 | 7/2003 | Ketcham | |
| 6,609,153 B1 | 8/2003 | Salkewicz | |
| 6,614,774 B1 | 9/2003 | Wang | |
| 6,640,251 B1 | 10/2003 | Wiget | |
| 6,680,945 B1 | 1/2004 | Merchant | |
| 6,717,919 B1 | 4/2004 | Ketcham | |
| 6,781,982 B1 | 8/2004 | Borella | |
| 6,847,620 B1 | 1/2005 | Meier | |
| 6,877,041 B2 | 4/2005 | Sullivan | |
| 6,937,566 B1 * | 8/2005 | Forslow | 370/231 |
| 7,000,012 B2 * | 2/2006 | Moore et al. | 709/220 |
| 7,000,015 B2 * | 2/2006 | Moore et al. | 709/224 |
| 7,007,079 B2 * | 2/2006 | Moore et al. | 709/220 |
| 7,039,687 B1 | 5/2006 | Jamieson | |
| 7,043,540 B2 * | 5/2006 | Moore et al. | 709/220 |
| 7,072,964 B1 | 7/2006 | Whittle | |
| 7,119,713 B2 | 10/2006 | Shuey | |
| 7,154,861 B1 | 12/2006 | Merchant | |

(Continued)

OTHER PUBLICATIONS

Aerohive Networks, "Aerohive Demostrates Industry First Bonjour Gateway to Enable Apple AirPlay and Apple AirPrint Across Multi-Subnet Enterprise Networks," Sunnyvale, CA, Mar. 5, 2012, 3 pages.

(Continued)

*Primary Examiner* — Nicholas Sloms
(74) *Attorney, Agent, or Firm* — Berkeley Law & Technology Group, LLP

(57) ABSTRACT

Briefly, methods and apparatuses are described that link two or more logical broadcast domains.

30 Claims, 5 Drawing Sheets

(56) References Cited

U.S. PATENT DOCUMENTS

| | | | |
|---|---|---|---|
| 7,194,622 B1 | 3/2007 | Halasz | |
| 7,447,166 B1* | 11/2008 | Kaluve | H04L 12/66 370/254 |
| 7,480,710 B1 | 1/2009 | Olson | |
| 7,519,056 B2 | 4/2009 | Ishwar | |
| 7,644,437 B2 | 1/2010 | Volpano | |
| 7,743,155 B2 | 6/2010 | Pisharody | |
| 7,760,632 B2 | 7/2010 | Yano | |
| 7,774,837 B2* | 8/2010 | McAlister | 726/15 |
| 7,894,432 B2* | 2/2011 | Rana | H04L 45/04 370/392 |
| 7,937,471 B2 | 5/2011 | Alkhatib | |
| 7,941,837 B1 | 5/2011 | Jiang | |
| 7,954,145 B2 | 5/2011 | Mohanty | |
| 7,961,725 B2* | 6/2011 | Nagarajan et al. | 370/389 |
| 8,036,664 B2* | 10/2011 | Khetawat et al. | 455/436 |
| 8,041,824 B1 | 10/2011 | Maeng | |
| 8,116,226 B1 | 2/2012 | Liao | |
| 8,150,397 B2* | 4/2012 | Khetawat et al. | 455/436 |
| 8,159,986 B2* | 4/2012 | Yun et al. | 370/312 |
| 8,170,037 B2 | 5/2012 | Polcha | |
| 8,189,600 B2* | 5/2012 | Jabr | H04L 12/467 370/351 |
| 8,204,502 B2* | 6/2012 | Khetawat et al. | 455/436 |
| 8,228,818 B2* | 7/2012 | Chase et al. | 370/253 |
| 8,230,051 B1 | 7/2012 | Zahavi | |
| 8,234,361 B2 | 7/2012 | Krywaniuk | |
| 8,327,437 B2* | 12/2012 | McAlister | 726/15 |
| 8,422,380 B2 | 4/2013 | Gaskill | |
| 8,428,049 B2 | 4/2013 | Gass | |
| 8,477,775 B2* | 7/2013 | Choudhary et al. | 370/389 |
| 8,595,359 B2 | 11/2013 | Shaffer | |
| 8,619,771 B2 | 12/2013 | Lambeth | |
| 8,644,188 B1 | 2/2014 | Brandwine | |
| 8,660,129 B1 | 2/2014 | Brendel | |
| 8,725,860 B1 | 5/2014 | Voltmer | |
| 8,862,725 B1 | 10/2014 | Voltmer | |
| 8,966,027 B1 | 2/2015 | Brandwine | |
| 9,032,077 B1 | 5/2015 | Klein et al. | |
| 9,118,495 B1 | 8/2015 | Hankins | |
| 9,154,327 B1 | 10/2015 | Marino | |
| 9,306,910 B2 | 4/2016 | Lambeth | |
| 9,356,833 B2 | 5/2016 | Xu | |
| 9,392,313 B2 | 7/2016 | Bugenhagen | |
| 9,888,097 B2 | 2/2018 | Lambeth | |
| 9,900,410 B2 | 2/2018 | Dalal | |
| 9,973,415 B2 | 5/2018 | Cheng | |
| 9,992,062 B1 | 6/2018 | Hankins | |
| 10,110,417 B1 | 10/2018 | Hankins | |
| 10,135,677 B1 | 11/2018 | Hankins | |
| 10,177,957 B1 | 1/2019 | Hankins | |
| 10,326,652 B2 | 6/2019 | Hankins | |
| 10,389,583 B2 | 8/2019 | Hankins | |
| 10,505,989 B2 | 12/2019 | Hankins | |
| 10,560,343 B1 | 2/2020 | Cartsonis | |
| 10,601,653 B2 | 3/2020 | Hankins | |
| 10,637,729 B2 | 4/2020 | Hankins | |
| 10,764,110 B2 | 9/2020 | Hankins et al. | |
| 10,819,569 B2 | 10/2020 | Hankins et al. | |
| 2001/0042131 A1 | 11/2001 | Mathon | |
| 2001/0047407 A1* | 11/2001 | Moore et al. | 709/223 |
| 2002/0012327 A1 | 1/2002 | Okada | |
| 2002/0032780 A1* | 3/2002 | Moore et al. | 709/228 |
| 2002/0057684 A1 | 5/2002 | Miyamoto | |
| 2002/0065906 A1 | 5/2002 | Davidson | |
| 2002/0097732 A1* | 7/2002 | Worster | H04L 47/19 370/408 |
| 2003/0009540 A1 | 1/2003 | Benfield | |
| 2003/0051195 A1 | 3/2003 | Bosa | |
| 2003/0140131 A1 | 7/2003 | Chandrashekhar | |
| 2003/0198208 A1 | 10/2003 | Koos | |
| 2003/0200295 A1 | 10/2003 | Roberts et al. | |
| 2004/0017816 A1 | 1/2004 | Ishwar | |
| 2004/0032856 A1 | 2/2004 | Sandstrom | |
| 2004/0156345 A1 | 8/2004 | Steer et al. | |
| 2004/0221026 A1* | 11/2004 | Dorland | H04L 29/06 709/223 |
| 2004/0252722 A1 | 12/2004 | Wybenga | |
| 2005/0076339 A1 | 4/2005 | Merril | |
| 2005/0154790 A1 | 7/2005 | Nagata et al. | |
| 2005/0190705 A1* | 9/2005 | Moore et al. | 370/254 |
| 2005/0193127 A1* | 9/2005 | Moore et al. | 709/228 |
| 2005/0208947 A1 | 9/2005 | Bahl | |
| 2006/0215582 A1 | 9/2006 | Castagnoli et al. | |
| 2007/0047557 A1* | 3/2007 | Martini | H04L 12/4641 370/395.53 |
| 2007/0070937 A1 | 3/2007 | Demirhan | |
| 2007/0121565 A1 | 5/2007 | Halasz et al. | |
| 2007/0168547 A1 | 7/2007 | Krywaniuk | |
| 2007/0195800 A1 | 8/2007 | Yang | |
| 2007/0201375 A1 | 8/2007 | Hallinan | |
| 2007/0234419 A1 | 10/2007 | Shouno | |
| 2008/0049777 A1 | 2/2008 | Morrill et al. | |
| 2008/0076419 A1* | 3/2008 | Khetawat et al. | 455/435.1 |
| 2008/0080508 A1* | 4/2008 | Das | H04L 12/4633 370/392 |
| 2008/0089334 A1 | 4/2008 | Soja-Molloy | |
| 2008/0101366 A1 | 5/2008 | Venkitaraman | |
| 2008/0101367 A1 | 5/2008 | Weinman | |
| 2008/0114863 A1 | 5/2008 | Baskey et al. | 709/222 |
| 2008/0144625 A1* | 6/2008 | Wu | H04L 12/4641 370/392 |
| 2008/0148379 A1* | 6/2008 | Xu | H04L 29/125 726/11 |
| 2008/0183853 A1 | 7/2008 | Manion | |
| 2009/0034431 A1* | 2/2009 | Nagarajan et al. | 370/254 |
| 2009/0046714 A1 | 2/2009 | Holmer et al. | |
| 2009/0059930 A1 | 3/2009 | Ryan | |
| 2009/0086742 A1 | 4/2009 | Ghai | |
| 2009/0106394 A1* | 4/2009 | Lin | H04L 29/125 709/218 |
| 2009/0129386 A1* | 5/2009 | Rune | 370/392 |
| 2009/0138620 A1 | 5/2009 | Johnson et al. | |
| 2009/0213859 A1 | 8/2009 | De Silva | |
| 2009/0300750 A1 | 12/2009 | Chou | |
| 2009/0310610 A1 | 12/2009 | Sandstrom | |
| 2010/0023958 A1 | 1/2010 | Bugenhagen | |
| 2010/0061288 A1* | 3/2010 | Yun et al. | 370/312 |
| 2010/0061724 A1 | 3/2010 | Sun | |
| 2010/0077204 A1* | 3/2010 | Kawano | H04L 63/0428 713/153 |
| 2010/0180014 A1 | 7/2010 | Kannan et al. | |
| 2010/0290398 A1* | 11/2010 | Choudhary et al. | 370/328 |
| 2010/0290445 A1 | 11/2010 | Ankaiah | |
| 2010/0322251 A1 | 12/2010 | Li | |
| 2011/0122834 A1 | 5/2011 | Walker | |
| 2011/0162060 A1 | 6/2011 | Vijayakumar et al. | |
| 2011/0252230 A1 | 10/2011 | Segre | |
| 2011/0261828 A1 | 10/2011 | Smith | |
| 2012/0014387 A1 | 1/2012 | Dunbar | |
| 2012/0063451 A1 | 3/2012 | Keesara | |
| 2012/0315882 A1 | 12/2012 | Chang et al. | |
| 2013/0018994 A1 | 1/2013 | Flavel | |
| 2013/0044629 A1 | 2/2013 | Biswas | |
| 2013/0044763 A1 | 2/2013 | Koponen | |
| 2013/0060966 A1* | 3/2013 | Moisiadis | H04W 40/246 709/250 |
| 2013/0086280 A1* | 4/2013 | James | H04L 12/4625 709/238 |
| 2013/0121154 A1 | 5/2013 | Guay | |
| 2013/0121209 A1 | 5/2013 | Padmanabhan | |
| 2013/0163594 A1 | 6/2013 | Sharma | |
| 2013/0182712 A1* | 7/2013 | Aguayo | H04L 12/4633 370/395.53 |
| 2013/0250951 A1 | 9/2013 | Koganti | |
| 2013/0276090 A1 | 10/2013 | Kopti | |
| 2013/0287022 A1 | 10/2013 | Banavalikar et al. | |
| 2013/0287026 A1 | 10/2013 | Davie | |
| 2013/0347072 A1* | 12/2013 | Dinha | H04L 63/0272 726/4 |
| 2014/0040750 A1 | 2/2014 | Kamath et al. | |
| 2014/0112343 A1 | 4/2014 | Lambeth et al. | |
| 2014/0133354 A1 | 5/2014 | Scharf | |

(56) References Cited

U.S. PATENT DOCUMENTS

| | | |
|---|---|---|
| 2014/0153572 A1 | 6/2014 | Hampel |
| 2014/0226652 A1 | 8/2014 | Rao |
| 2014/0244847 A1 | 8/2014 | Pouyllau |
| 2014/0282850 A1 | 9/2014 | Mattes |
| 2015/0106913 A1 | 4/2015 | Wang |
| 2016/0294638 A1 | 10/2016 | Masuda |
| 2018/0139713 A1 | 5/2018 | Shukla |
| 2018/0324043 A1 | 11/2018 | Hankins |
| 2018/0331902 A1 | 11/2018 | Hankins |
| 2019/0075011 A1 | 3/2019 | Hankins |
| 2019/0081856 A1 | 3/2019 | Hankins |
| 2019/0158539 A1 | 5/2019 | Hankins |
| 2019/0182099 A1 | 6/2019 | Hankins |
| 2019/0182111 A1 | 6/2019 | Hankins |
| 2019/0268224 A1 | 8/2019 | Hankins |
| 2020/0162513 A1 | 5/2020 | Hankins |

OTHER PUBLICATIONS

U.S. Appl. No. 13/543,729, filed Jul. 6, 2012, 54 Pages.
U.S. Appl. No. 13/543,729: Filing Receipt, Mailed Jul. 23, 2012, 3 Pages.
U.S. Appl. No. 13/543,729: Application Data Sheet, Mailed Aug. 14, 2012, 7 Pages.
U.S. Appl. No. 13/543,729: Preliminary Amendment, dated Sep. 11, 2012, 6 Pages.
U.S. Appl. No. 13/543,729: Preliminary Amendment, dated Dec. 18, 2012, 15 Pages.
U.S. Appl. No. 13/543,729: Non-Final Office Action, dated Jan. 9, 2014, 20 Pages.
U.S. Appl. No. 13/543,729: Applicant Initiated Interview Summary (PTOL-413), dated Feb. 3, 2014, 3 Pages.
U.S. Appl. No. 13/543,729: Non-Final Office Action Response, dated Apr. 9, 2014, 36 Pages.
U.S. Appl. No. 13/543,729: Final Office Action, dated Apr. 30, 2014, 21 Pages.
U.S. Appl. No. 13/543,729: After Final Consideration Program Request, dated Jun. 30, 2014, 37 Pages.
U.S. Appl. No. 13/543,729: Amendment After Final or under 37 CFR 1.312, dated Jul. 9, 2014, 4 Pages.
U.S. Appl. No. 13/543,729: Request for Continued Examination, dated Jul. 16, 2014, 38 Pages.
U.S. Appl. No. 13/747,371, filed Jan. 22, 2013, 76 Pages.
U.S. Appl. No. 13/747,371: Notice to File Missing Parts and Filing Receipt, dated Feb. 15, 2013, 5 Pages.
U.S. Appl. No. 13/747,371: Application Data Sheet, Mailed Mar. 13, 2013, 5 Pages.
U.S. Appl. No. 13/747,371: Notice to File Missing Parts, dated Apr. 1, 2013, 22 Pages.
U.S. Appl. No. 13/747,371: Applicant Response to Pre-Exam Formalities Notice, dated Jun. 3, 2013, 16 Pages.
U.S. Appl. No. 13/747,371: Filing Receipt, Mailed Jun. 13, 2013, 3 Pages.
U.S. Appl. No. 13/802,529, filed Mar. 13, 2013, 81 Pages.
U.S. Appl. No. 13/802,529: Notice to File Missing Parts and Filing Receipt, dated Apr. 23, 2013, 5 Pages.
U.S. Appl. No. 13/802,529: Applicant Response to Pre-Exam Formalities Notice, dated May 10, 2013, 9 Pages.
U.S. Appl. No. 13/802,529: Filing Receipt, Mailed May 20, 2013, 3 Pages.
U.S. Appl. No. 13/802,529: Non-Final Office Action, dated Jul. 22, 2014, 17 Pages.
U.S. Appl. No. 13/829,611, filed Mar. 14, 2013, 83 Pages.
U.S. Appl. No. 13/829,611: Notice to File Missing Parts and Filing Receipt, dated May 2, 2013, 5 Pages.
U.S. Appl. No. 13/829,611: Applicant Response to Pre-Eam Formalities Notice, dated Jun. 7, 2013, 5 Pages.
U.S. Appl. No. 13/829,611: Filing Receipt, Mailed Jul. 9, 2013, 3 Pages.
U.S. Appl. No. 13/831,306, filed Mar. 14, 2013, 88 Pages.
U.S. Appl. No. 13/831,306: Notice to File Missing Parts and Filing Receipt, dated May 6, 2013, 5 Pages.
U.S. Appl. No. 13/831,306: Applicant Response to Pre-Exam Formalities Notice, dated Jun. 27, 2013, 6 Pages.
U.S. Appl. No. 13/831,306: Filing Receipt, dated Jul. 9, 2013, 3 Pages.
U.S. Appl. No. 13/844,254, filed Mar. 15, 2013, 99 Pages.
U.S. Appl. No. 13/844,254: Notice to File Missing Parts and Filing Receipt, dated May 9, 2013, 5 Pages.
U.S. Appl. No. 13/844,254: Applicant Response to Pre-Exam Formalities Notice, dated Jun. 27, 2013, 5 Pages.
U.S. Appl. No. 13/844,254: Filing Receipt, Mailed Jul. 9, 2013, 3 Pages.
Williams, "Pertino Offers a Cloud-Based Network, No Hardware Required," Feb. 12, 2013, www.techcrunch.com, 3 Pages.
U.S. Appl. No. 13/543,729: Notice of Allowance and Fees, dated Apr. 23, 2015, 24 pages.
U.S. Appl. No. 13/543,729: Filing Receipt, mailed May 14, 2015, 3 pages.
U.S. Appl. No. 13/543,729: Issue Notification, dated Aug. 5, 2015, 1 page.
U.S. Appl. No. 13/747,371: Non-Final Rejection dated Mar. 2, 2015, 24 pages.
U.S. Appl. No. 13/747,371: Final Rejection dated Nov. 6, 2015, 41 pages.
U.S. Appl. No. 13/802,529: Amendment/Req Reconsideration After Non-Final Reject, Filed Nov. 5, 2014, 28 Pages.
U.S. Appl. No. 13/802,529: Final Rejection dated Feb. 19, 2015, 27 pages.
U.S. Appl. No. 13/802,529: RCE and Amendments, filed Aug. 17, 2015, 25 pages.
U.S. Appl. No. 13/829,611: Non-Final Rejection, dated Jun. 16, 2015, 14 pages.
U.S. Appl. No. 13/829,611: Amendment/Req. Reconsideration After Non-Final Reject, filed Dec. 15, 2015, 22 pages.
U.S. Appl. No. 13/831,306: Non-Final Rejection, dated Jun. 25, 2015, 13 pages.
U.S. Appl. No. 13/844,254: Non-Final Rejection and Examiner Search, dated Aug. 4, 2015, 17 pages.
McQuerry, Stephen, CCNA Self-Study (ICND Exam): Extending Switched Networks with Virtual LANs Dec. 5, 2003.
U.S. Appl. No. 13/747,371: After Final Consideration Program Request, dated Jan. 7, 2016, 30 pages.
US App. 13/747,371: Advisory Action and After Final Decision, dated Jan. 29, 2016, 18 pages.
U.S. Appl. No. 13/747,371: RCE, Mar. 4, 2016, 28 pages.
U.S. Appl. No. 13/747,371: Non-Final Rejection, dated Aug. 11, 2016, 8 pages.
U.S. Appl. No. 13/747,371: Abandonment, dated Feb. 23, 2017, 2 pages.
U.S. Appl. No. 15/348,902, filed Nov. 10, 2016, 79 pages.
U.S. Appl. No. 15/348,902: Preliminary Amendment, dated Nov. 10, 2016, 18 pages.
U.S. Appl. No. 15/348,902: Notice to File Missing Parts, dated Nov. 21, 2016, 3 pages.
U.S. Appl. No. 15/348,902: Filing Receipt, Nov. 21, 2016, 3 pages.
U.S. Appl. No. 15/348,902: Applicant Response to Pre-Exam Formalities Notice and Amendments, dated Jan. 23, 2017, 112 pages.
U.S. Appl. No. 15/348,902: Filing Receipt, Jan. 25, 2017, 3 pages.
U.S. Appl. No. 13/802,529: Non-Final Rejection, dated Dec. 29, 2015, 38 pages.
U.S. Appl. No. 13/802,529: Amendment/Req. Reconsideration-After Non-Final Rejection, dated Mar. 24, 2016.
U.S. Appl. No. 13/802,529: Final Rejection, dated Jul. 14, 2016, 38 pages.
U.S. Appl. No. 13/802,529: Response After Final Action, dated Oct. 14, 2016, 44 pages.
U.S. Appl. No. 13/802,529: Advisory Action, dated Nov. 7, 2016, 3 pages.
U.S. Appl. No. 13/802,529: Response After Final Action, dated Dec. 9, 2016, 27 pages.
U.S. Appl. No. 13/802,529: Advisory Action, dated Dec. 29, 2016, 4 pages.

(56) References Cited

OTHER PUBLICATIONS

U.S. Appl. No. 13/802,529: RCE and Amendments, dated Jan. 6, 2017, 25 pages.
U.S. Appl. No. 13/802,529: Non-Final Rejection, dated Mar. 29, 2017, 35 pages.
U.S. Appl. No. 13/802,529: Amendment/Req. Reconsideration-After Non-Final Reject, dated Jun. 29, 2017, 23 pages.
U.S. Appl. No. 13/802,529: Non-Final Rejection, dated Feb. 7, 2018, 35 pages.
U.S. Appl. No. 13/829,611: Final Rejection, dated Dec. 30, 2016, 16 pages.
U.S. Appl. No. 13/829,611: After Final Consideration Program Request, dated Mar. 24, 2016, 21 pages.
U.S. Appl. No. 13/829,611: Advisory Action and After Final Decision, dated Apr. 5, 2016, 7 pages.
U.S. Appl. No. 13/829,611: RCE, May 2, 2016, 25 pages.
U.S. Appl. No. 13/829,611: Non-Final Rejection, dated Jun. 16, 2016, 16 pages.
U.S. Appl. No. 13/829,611: Amendment/Req. Reconsideration—After Non-Final Reject, dated Sep. 16, 2016, 19 pages.
U.S. Appl. No. 13/829,611: Final Rejection, dated Oct. 5, 2017, 14 pages.
U.S. Appl. No. 13/829,611: Response After Final Action, dated Jan. 5, 2017, 17 pages.
U.S. Appl. No. 13/829,611: Advisory Action, dated Jan. 30, 2017, 3 pages.
U.S. Appl. No. 13/829,611: RCE and Amendments, dated Feb. 21, 2017, 20 pages.
U.S. Appl. No. 13/829,611: Non-Final Rejection, dated Mar. 23, 2017, 12 pages.
U.S. Appl. No. 13/829,611: Amendment/Req. Reconsideration-After Non-Final Reject, dated Jun. 22, 2017, 18 pages.
U.S. Appl. No. 13/829,611: Final Rejection, dated Sep. 12, 2017, 16 pages.
U.S. Appl. No. 13/829,611: After Final Consideration Program Request, dated Dec. 12, 2017, 17 pages.
U.S. Appl. No. 13/829,611: RCE and Amendments, dated Mar. 7, 2018, 25 pages.
U.S. Appl. No. 13/831,306: Amendment/Req. Reconsideration—After Non-Final Rejection, dated Dec. 28, 2016, 25 pages.
U.S. Appl. No. 13/831,306: Final Rejection, dated Mar. 22, 2016, 15 pages.
U.S. Appl. No. 13/831,306: Response After Final Action, dated Jul. 19, 2016, 19 pages.
U.S. Appl. No. 13/831,306: Advisory Action, dated Jul. 22, 2016, 3 pages.
U.S. Appl. No. 13/831,306: Filing Receipt, Jul. 27, 2016 4 pages.
U.S. Appl. No. 13/831,306: RCE and Amendments, dated Aug. 22, 2016, 10 pages.
U.S. Appl. No. 13/831,306: Non-Final Rejection, dated Sep. 28, 2016, 12 pages.
U.S. Appl. No. 13/831,306: Amendment/Req. Reconsideration—After Non-Final Reject, dated Jan. 6, 2017, 15 pages.
U.S. Appl. No. 13/831,306: Supplemental Response or Supplemental Amendment, dated Feb. 21, 2017, 16 pages.
U.S. Appl. No. 13/831,306: Final Rejection, dated Jun. 12, 2017, 11 pages.
U.S. Appl. No. 13/831,306: Response After Final Action, dated Aug. 14, 2017, 15 pages.
U.S. Appl. No. 13/831,306: Advisory Action, dated Aug. 30, 2017, 3 pages.
U.S. Appl. No. 13/831,306: RCE and Amendments, dated Sep. 12, 2017, 33 pages.
U.S. Appl. No. 13/831,306: Non-Final Rejection, dated Oct. 5, 2017, 15 pages.
U.S. Appl. No. 13/831,306: Amendment/Req. Reconsideration—After Non-Final Reject, dated Jan. 5, 2018.
U.S. Appl. No. 13/831,306: Final Rejection, dated May 1, 2018, 13 pages.
U.S. Appl. No. 13/831,306: After Final Consideration Program Request, dated May 10, 2018, 13 pages.
U.S. Appl. No. 13/844,254: Amendment/Req. Reconsideration—After Non-Final Rejection, dated Jan. 4, 2016, 40 pages.
U.S. Appl. No. 13/844,254: Final Rejection, dated Apr. 7, 2016, 27 pages.
U.S. Appl. No. 13/844,254: Response After Final, dated Jun. 22, 2017, 17 pages.
U.S. Appl. No. 13/844,254: Advisory Action, dated Jun. 30, 2017, 5 pages.
U.S. Appl. No. 13/844,254: RCE and Amendments, dated Aug. 28, 2017, 21 pages.
U.S. Appl. No. 13/844,254: Notice of Allowance and Fees Due, dated Dec. 29, 2017.
U.S. Appl. No. 13/844,254: Notice of Allowance and Fees Due, dated Jan. 10, 2018, 2 pages.
U.S. Appl. No. 13/844,254: Amendment after Notice of Allowance, dated Mar. 21, 2018, 13 pages.
U.S. Appl. No. 13/844,254: Amendment after Notice of Allowance, dated Mar. 26, 2018, 12 pages.
U.S. Appl. No. 13/844,254: Issue Fee Payment, Mar. 28, 2018, 1 page.
U.S. Appl. No. 15/940,870: Application and Preliminary Amendment, dated Mar. 29, 2018, 114 pages.
U.S. Appl. No. 15/940,870: Notice to File Corrected Application Papers, dated Apr. 25, 2018, 2 pages.
U.S. Appl. No. 15/940,870: Filing Receipt, Apr. 25, 2018, 4 pages.
U.S. Appl. No. 15/348,902: Application Data Sheet to update/correct info, Jun. 20, 2018, 8 pages.
U.S. Appl. No. 15/348,902: Filing Receipt, Jul. 10, 2018, 3 pages.
U.S. Appl. No. 13/802,529: Application Data Sheet to update/correct info, Jun. 20, 2018, 7 pages.
U.S. Appl. No. 13/802,529: Filing Receipt, Jul. 10, 2018, 3 pages.
U.S. Appl. No. 13/802,529: Terminal Disclaimer, Aug. 8, 2018, 3 pages.
U.S. Appl. No. 13/829,611: Notice of Allowance and Fees Due, dated May 17, 2018, 13 pages.
U.S. Appl. No. 13/829,611: Notice of Allowance and Fees Due, dated Jun. 4, 2018, 2 pages.
U.S. Appl. No. 13/829,611: Request for Corrected Filing Receipt, Jun. 13, 2018, 7 pages.
U.S. Appl. No. 13/829,611: Filing Receipt, Jun. 18, 2018, 3 pages.
U.S. Appl. No. 13/829,611: Notice of allowance and Fees Due and Amendment, dated Aug. 3, 2018, 16 pages.
U.S. Appl. No. 13/829,611: Notice of allowance and Fees Due, dated Aug. 9, 2018, 2 pages.
U.S. Appl. No. 13/831,306: Notice of Allowance and Fees Due, dated Jul. 11, 2018, 2 pages.
U.S. Appl. No. 13/831,306: Notice of Allowance and Fees Due, dated Jul. 23, 2018, 2 pages.
U.S. Appl. No. 13/831,306: Notice of Allowance and Fees Due, dated Aug. 3, 2018, 2 pages.
U.S. Appl. No. 13/831,306: Amendment after Notice of Allowance, dated Aug. 27, 2018, 11 pages.
U.S. Appl. No. 15/940,870: Preliminary Amendment, dated Jun. 19, 2018, 185 pages.
U.S. Appl. No. 15/940,870: Filing Receipt, Jul. 10, 2018, 4 pages.
U.S. Appl. No. 16/045,624, filed Jul. 25, 2018, 102 pages.
U.S. Appl. No. 16/045,624: Preliminary Amendment, dated Jul. 25, 2018, 13 pages.
U.S. Appl. No. 16/045,624: Request for Corrected Filing Receipt, Jul. 26, 2018, 11 pages.
U.S. Appl. No. 16/045,624: Filing Receipt, Aug. 9, 2018, 3 pages.
U.S. Appl. No. 13/802,529: Issue Fee Payment, Nov. 30, 2018, 1 page.
U.S. Appl. No. 13/802,529: Amendment after Notice of Allowance, dated Nov. 30, 2018, 3 page.
U.S. Appl. No. 16/192,539, filed Nov. 15, 2018, 87 pages.
U.S. Appl. No. 16/192,539: Notice to File Missing Parts, dated Dec. 7, 2018, 2 pages.
U.S. Appl. No. 16/192,539: Filing Receipt, Dec. 7, 2018, 3 pages.
U.S. Appl. No. 16/125,578: Notice to File Missing Parts, dated Sep. 27, 2018, 2 pages.

(56) References Cited

OTHER PUBLICATIONS

U.S. Appl. No. 16/125,578: Filing Receipt, Sep. 27, 2018, 3 pages.
U.S. Appl. No. 16/125,578: Applicant Response to Pre-Exam Formalities Notice and Preliminary Amendment, dated Nov. 27, 2018, 28 pages.
U.S. Appl. No. 16/125,578: Filing Receipt, Nov. 29, 2018, 3 pages.
U.S. Appl. No. 13/831,306: Notice of Allowance and Fees Due, dated Oct. 9, 2018, 2 pages.
U.S. Appl. No. 13/831,306: Issue Notification, dated Oct. 31, 2018, 1 page.
U.S. Appl. No. 16/128,985: Notice to File Missing Parts, dated Oct. 2, 2018, 2 pages.
U.S. Appl. No. 16/128,985: Filing Receipt, Oct. 2, 2018, 4 pages.
U.S. Appl. No. 16/128,985: Preliminary Amendment, dated Dec. 3, 2018, 13 pages.
U.S. Appl. No. 16/128,985: Request for Corrected Filing Receipt, Dec. 3, 2018, 6 pages.
U.S. Appl. No. 16/128,985: Filing Receipt, Dec. 6, 2018, 4 pages.
U.S. Appl. No. 15/940,870: Request for Corrected Filing Receipt, Oct. 31, 2018, 6 pages.
U.S. Appl. No. 15/940,870: Non-Final Rejection, dated Nov. 1, 2018, 14 pages.
U.S. Appl. No. 15/940,870: Filing Receipt, Nov. 2, 2018, 4 pages.
U.S. Appl. No. 15/940,870: Notice of Publication, dated Nov. 8, 2018, 1 page.
U.S. Appl. No. 16/045,624: Non-Final Rejection, dated Nov. 1, 2018, 11 pages.
U.S. Appl. No. 16/045,624: Notice of Publication, dated Nov. 15, 2018, 1 page.
U.S. Appl. No. 16/045,624: Filing Receipt, Dec. 4, 2018, 4 pages.
Chowdhury et al., "A survey of network virtualization", *Computer Networks*, 54 (2010), pp. 862-876.
U.S. Appl. No. 15/348,902: Non-Final Rejection, dated Dec. 18, 2018, 27 pages.
U.S. Appl. No. 16/192,539: Applicant Response to Pre-Exam Formalities Notice, dated Feb. 7, 2019, 17 pages.
U.S. Appl. No. 16/192,539: Filing Receipt, Feb. 11, 2019, 3 pages.
U.S. Appl. No. 15/940,870: Terminal Disclaimer and Amendment/Req. Reconsideration—After Non-Final Reject, Dec. 27, 2018, 21 pages.
U.S. Appl. No. 15/940,870: Notice of Allowance and Fees Due, dated Jan. 30, 2019, 6 pages.
U.S. Appl. No. 16/045,624: Amendment/Req. Reconsideration—After Non-Final Reject, dated Dec. 27, 2018, 21 pages.
U.S. Appl. No. 16/045,624: Final Rejection, dated Jan. 29, 2019, 11 pages.
Onisick, Joe, "Network Overlays: An introduction", *Network Computing*, https://www.networkcomputing.com, published Dec. 2012, retrieved Dec. 16, 2018, 7 pages.
U.S. Appl. No. 15/348,902: Amendment/Req. Reconsideration—After Non-Final Rejection, dated Mar. 18, 2019, 34 pages.
U.S. Appl. No. 15/348,902: Final Rejection, dated Apr. 16, 2019, 30 pages.
U.S. Appl. No. 16/192,539: Non-Final Rejection, dated Apr. 1, 2019, 8 pages.
U.S. Appl. No. 16/125,578: Notice of Publication, dated Mar. 7, 2019, 1 page.
U.S. Appl. No. 16/277,911, filed Feb. 15, 2019, 99 pages.
U.S. Appl. No. 16/277,911: Filing Receipt, Mar. 6, 2019, 4 pages.
U.S. Appl. No. 16/128,985: Notice of Publication, dated Mar. 14, 2019, 1 page.
U.S. Appl. No. 16/277,926, filed Feb. 15, 2019, 114 pages.
U.S. Appl. No. 16/277,926: Filing Receipt, Mar. 5, 2019, 4 pages.
U.S. Appl. No. 16/045,624: Response After Final Action, dated Mar. 19, 2019, 5 pages.
U.S. Appl. No. 16/045,624: Terminal Disclaimer, Mar. 19, 2019, 4 pages.
U.S. Appl. No. 16/045,624: Notice of Allowance, dated Apr. 1, 2019, 7 pages.

"Domain Definition", 2006, retrieved from https://techterms.com, on Nov. 1, 2015, 1 page, Doc 2003.
Indiana University—"What is a domain?", 2006, retrieved from http://kb.iu.edu/d/aoup on Nov. 1, 2015, 2 pages, Doc 2004.
Mitchell—"Subnet" retrieved from http://compnetworking.about.com on Nov. 1, 2015, 3 pages, Doc 2006.
Mitchell—"LAN—Local Area Network" retrieved from http://compnetworking.about.com on Nov. 1, 2015, 3 pages, Doc 2007.
U.S. Appl. No. 13/747,371: Response to Non-final Rejection filed Aug. 31, 2015, 32 pages, Doc 2028.
U.S. Appl. No. 15/348,902: Response to Final Office Action and After—Final Consideration Program Request dated Jun. 14, 2019, 35 pages, Doc 1096.
U.S. Appl. No. 15/348,902: Request for Continued Examination dated Jul. 12, 2019, 5 pages, Doc 1098.
U.S. Appl. No. 15/348,902: Notice of Allowance and Notice of Allowability dated Sep. 23, 2019, 7 pages, Doc 1099.
U.S. Appl. No. 16/720,448: Continuation Application as filed Dec. 19, 2019, 81 pages, Doc 1100.
U.S. Appl. No. 16/720,448: Response to Notice of Missing Parts and Preliminary Amendment filed Mar. 16, 2020, 38 pages, Doc 2019.
U.S. Appl. No. 13/802,529: Response to Non-final Rejection dated May 4, 2018, 28 pages, Doc 2030.
U.S. Appl. No. 13/802,529: Notice of Allowance dated Sep. 5, 2018, 54 pages, Doc 1116.
U.S. Appl. No. 16/192,539: Amendment and Terminal Disclaimer dated Jun. 27, 2019, 20 pages, Doc 1125.
U.S. Appl. No. 16/192,539: Approval of Terminal Disclaimer filed Aug. 9, 2019, 3 pages, Doc 1126.
U.S. Appl. No. 16/192,539: Notice of Allowance and Notice of Allowability dated Aug. 14, 2019, 44 pages, Doc 1127.
U.S. Appl. No. 16/192,539: Corrected Notice of Allowability dated Nov. 12, 2019, 6 pages, Doc 1129.
U.S. Appl. No. 16/688,846: Response to Notice to File Missing Parts and Preliminary Amendment filed Feb. 5, 2020, 21 pages, Doc 2013.
U.S. Appl. No. 13/829,611: Supplemental Notice of Allowability dated Sep. 14, 2018, 5 pages, Doc 1158.
U.S. Appl. No. 13/829,611: Certificate of Correction dated Dec. 4, 2018, 1 page, Doc 1266.
U.S. Appl. No. 16/125, 578: Non-final Office action dated Sep. 5, 2019, 28 pages, Doc 1166.
U.S. Appl. No. 16/125, 578: Amendment and Terminal Disclaimer dated Dec. 5, 2019, 18 pages, Doc 1167.
U.S. Appl. No. 16/125, 578: Notice of Allowance and Notice of Allowability dated Jan. 6, 2020, 22 pages, Doc 2010.
U.S. Appl. No. 13/831,306: Request for Corrected Filing Receipt, Amended ADS, and Power of Attorney filed Jul. 19, 2016, 13 pages, Doc 2034.
U.S. Appl. No. 13/831,306: Notice of Allowance dated Jun. 8, 2018, 9 pages, Doc 2035.
U.S. Appl. No. 13/831,306: Response to 312 Amendment dated Sep. 5, 2018, 2 pages, Doc 1191.
U.S. Appl. No. 16/128,985: Non-final Office Action dated Aug. 21, 2019, 25 pages, Doc 1202.
U.S. Appl. No. 16/128,985: Amendment and Terminal Disclaimer dated Nov. 11, 2019, 21 pages, Doc 1203.
U.S. Appl. No. 16/128,985: Notice of Allowance and Notice of Allowability dated Dec. 16, 2019, 12 pages, Doc 1211.
U.S. Appl. No. 16/128,985: Issue Fee Payment and Terminal Disclaimer filed Mar. 16, 2020, 9 pages, Doc 2021.
U.S. Appl. No. 16/128,985: Supplemental Notice of Allowability dated Mar. 24, 2020, 11 pages, Doc 2032.
U.S. Appl. No. 16/277,926: Non-final Office Action dated Oct. 2, 2019, 9 pages, Doc 1206.
U.S. Appl. No. 16/277,926: Response to Office Action and Terminal Disclaimer filed Jan. 2, 2020, 17 pages, Doc 1212.
U.S. Appl. No. 16/277,926: Notice of Allowance and Notice of Allowability dated Feb. 21, 2020, 29 pages, Doc 2016.
U.S. Appl. No. 13/844,254: Non-final Office Action dated Nov. 29, 2016, 17 pages, Doc 2038.

(56) References Cited

OTHER PUBLICATIONS

U.S. Appl. No. 13/844,254: Amendment dated Feb. 28, 2017, 25 pages, Doc 2039.
U.S. Appl. No. 13/844,254: Final Office Action dated Apr. 26, 2017, 19 pages, Doc 2040.
U.S. Appl. No. 15/940,870: Request for Corrected Filing Receipt dated Jul. 26, 2018, 13 pages, Doc 2049.
U.S. Appl. No. 15/940,870: Filing Receipt dated Jul. 30, 2018, 4 pages, Doc 2050.
U.S. Appl. No. 15/940,870: Preliminary Amendment dated Sep. 7, 2018, 13 pages, Doc 2051.
U.S. Appl. No. 16/045,624: Corrected Notice of Allowability dated Jul. 16, 2019, 11 pages, Doc 2064.
U.S. Appl. No. 16/405,825: Request for Corrected Filing Receipt filed Aug. 20, 2019, 11 pages, Doc 2065.
U.S. Appl. No. 16/405,825: Corrected Filing Receipt dated Aug. 23, 2019, 4 pages, Doc 2066.
U.S. Appl. No. 16/405,825: Preliminary Amendment and Terminal Disclaimer filed Oct. 23, 2019, 21 pages, Doc 2067.
U.S. Appl. No. 16/405,825: Notice of Allowance and Notice of Allowability dated Nov. 1, 2019, 36 pages, Doc 2068.
U.S. Appl. No. 16/405,825: Corrected Notice of Allowability dated Feb. 21, 2020, 4 pages, Doc 2069.
U.S. Appl. No. 16/785,992: U.S. Appl. No. 16/785,992 as filed with Preliminary Amendment on Feb. 10, 2020, 124 pages, Doc 2022.
U.S. Appl. No. 16/720,448 eTerminal Disclaimer filed and approved Oct. 1, 2020, 5 pages.
U.S. Appl. No. 16/720,448 Notice of Allowance and Allowability dated Oct. 21, 2020, 26 pages.
U.S. Appl. No. 16/125,578 Issue Notification dated Aug. 12, 2020, 1 page.
U.S. Appl. No. 16/277,911 Non-final Office Action dated Aug. 21, 2020, 33 pages.
U.S. Appl. No. 17/017,555 Continuation Patent Application and Preliminary Amendment filed Sep. 10, 2020, 119 pages.

\* cited by examiner

LINKING LOGICAL BROADCAST DOMAINS

FIELD

The present application relates to linking two or more logical broadcast domains, particularly at a network protocol level.

BACKGROUND

Various advancements in networking address interoperability of one or more devices across one or more networks. Two different physical networks may communicate via a network device. A network device, such as a router, may create a hardware bridge between two networks. Additionally, a remote device, such as a device on a remote network, for example, may communicate with a local network by executing a virtual private network (VPN), typically by executing a software program. In this context (e.g., throughout this document), the term "remote" or similar terms refer to the device not being a part of the network and the term "local" or similar terms refer to the collection of devices, for example, that are part of the network. VPN software, for example, may create a reasonably secure channel of communication between a remote device and local network and may route traffic to the remote device. This may allow the remote device to communicate with the local network as if the remote device were physically part of the local network, rather than remote.

Although physically connecting a network via a hardware bridge is done, there may be one or more drawbacks. A hardware bridge may not typically include a capability of interoperability via higher levels of a network protocol. A network protocol refers to a set of signaling conventions for communications between or among devices in a network, typically network devices; for example, devices that substantially comply with the protocol or that are substantially compatible with the protocol. In this context, the term "between" or similar terms are understood to include "among" if appropriate for the particular usage. Likewise, in this context, the terms "compatible with" or "comply with" or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible or compliant with the network protocol at these higher layers. Therefore, for example, a hardware bridge may be unable to forward signal packets since it may operate at a layer of a communication stack that does not provide that capability. Although higher layers of a network protocol may, for example, affect device communication permissions, user communication permissions, etc., a hardware bridge, for example, may typically provide little user control, such as for higher layer functions.

A second drawback of a hardware bridge is that it may be difficult to setup or modify without specialized skills and/or experience. Furthermore, making changes at a hardware layer may noticeably affect performance of a network, such as one or more layers of a network, for example.

A VPN, such as previously described, may enable a remote device to communicate via a local network, but may also have drawbacks. A router may allow communications in the form of transmissions (e.g., signal packets), for example, to occur from a remote device to a VPN server on a local network. A remote device may be authenticated and a VPN server, for example, may create a special route between a local network and the remote device. However, a route may be generated and also regenerate if the remote device is power cycled, for example. Also, a VPN typically may affect a single remote device, which may be limiting, for example, in some situations.

BRIEF DESCRIPTION OF THE DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
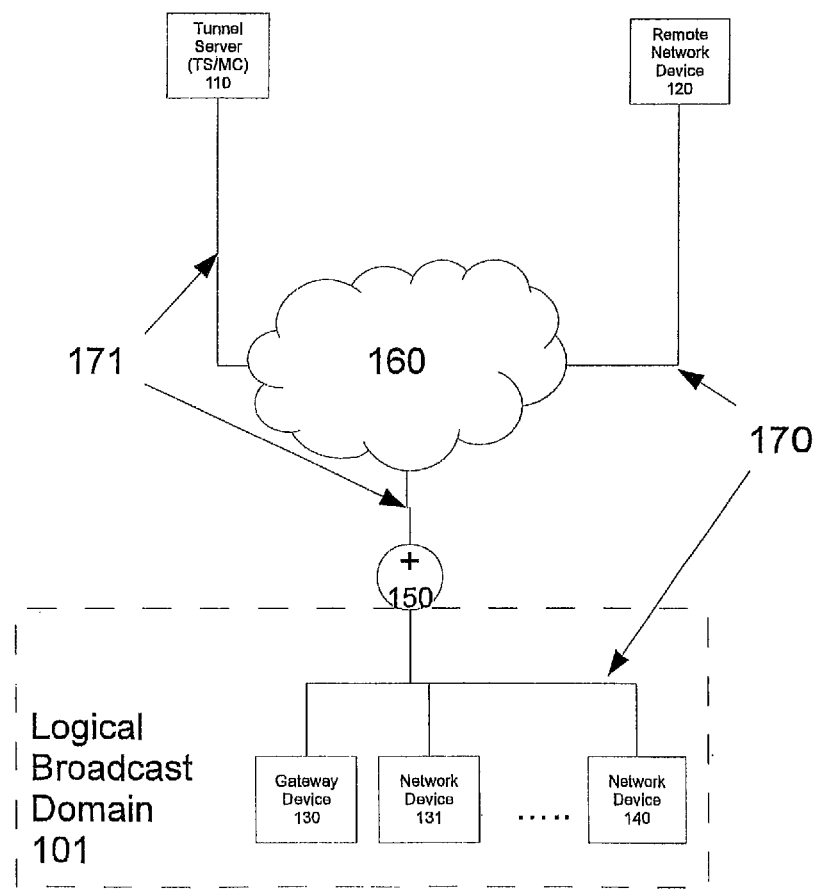
FIG. 1 is a schematic diagram illustrating an embodiment linking a remote network device and a logical broadcast domain.

Reference is made in the following detailed description to accompanying drawings, which form a part hereof, wherein like numerals may designate like parts throughout to indicate corresponding and/or analogous components, for example. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or similar references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment, or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, for example, may involve physical manipulations of physical quantities. Typically, although not necessarily, these quantities may take the form of electrical or magnetic signals capable of, for example, being stored, transferred, combined, processed, compared or otherwise manipulated. It has proven convenient, at times, principally for reasons of common usage, to refer to these signals as bits, data, values, elements, symbols, characters, terms, numbers, numerals or the like. It should be understood, however, that all of these or similar terms are to be associated with appropriate physical quantities and are intended to merely be convenient labels.

Likewise, in this context, the terms "coupled" or "connected," or similar terms, may be used. It should be understood that these terms are not intended as synonyms. Rather, "connected" may be used to indicate that two or more elements or other components, for example, are in direct physical or electrical contact; while, "coupled" may mean that two or more elements are in direct physical or electrical contact; however, "coupled" may also mean that two or more elements are not in direct contact, but may nonetheless co-operate or interact. The term coupled may also be understood to mean indirectly connected, for example, in an appropriate context.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices, including, for example, one or more illustrative examples.

In this context, the term network device refers to any device capable of communicating via and/or as part of a network. Network devices may be capable of sending or receiving signals (e.g., signal packets), such as via a wired or wireless network, or may be capable of performing arithmetic or logic operations, processing or storing signals, such as in memory as physical memory states, and/or may, for example, operate as a server. Network devices capable of operating as a server, or otherwise, may include, as examples, dedicated rack-mounted servers, desktop computers, laptop computers, set top boxes, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device or other types of network devices, including between wireless devices coupled via a wireless network, for example.

A network may also include now known, or to be later developed arrangements, derivatives, and/or improvements, including, for example, past, present or future mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, other connections, or any combination thereof. Likewise, sub-networks, such as may employ differing architectures or may be compliant or compatible with differing protocols, such as communication protocols (e.g., network communication protocols), may interoperate within a larger network. Various types of network devices may be made available so that device interoperability is enabled and/or, in at least some instances, may be transparent to the devices. In this context, the term transparent refers to network devices communicating via a network in which the devices are able to communicate via intermediate network devices, but without the communicating devices necessarily specifying one or more intermediate devices and/or may include communicating as if intermediate devices are not necessarily involved in communication transmissions. For example, a router may provide a link between otherwise separate and/or independent LANs.

The Internet refers to a decentralized global network of interoperable networks. The Internet includes local area networks (LANs), wide area networks (WANs), wireless networks, or long haul public networks that, for example, may allow signal packets to be communicated between LANs. Signal packets, also referred to as signal packet transmissions, may be communicated between nodes of a network, where a node may comprise one or more network devices, for example. As an illustrative example, but without limitation, a node may comprise one or more sites employing a local network address. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path to a target address.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Although a router may link otherwise independent LANs through routing of signal packets, a router may also provide some limits on signal packet transmissions to a select set of devices, for example. A router may limit signal packet transmissions via implicitly or explicitly producing a broadcast domain (also referred to as BD or as a broadcast domain). In this context, the term broadcast domain refers to a set of devices, including associated services and/or support, occupying an address space, such as a local network address space, in which any device is able to communicate with any other device in the broadcast domain without rerouting a transmission, such as a signal packet. For example, a signal packet may be transmitted to other devices in the broadcast domain without being directed or redirected via a router or similar device, such as a device capable of affecting routing of signal packets, for example. Using a router or a similar device able to perform network address translation (NAT), portions of networks may be logically separate and independent such that transmissions in the form of signal packets by a network device on a network, for example, may not necessarily be forwarded from the BD unless a destination having a particular destination address of a signal packet transmission exists outside the particular broadcast domain. This type of approach effectively illustrates one example of logically independent and separate (e.g., non-overlapping) divisions of a network, which may comprise an example of a broadcast domain.

Examples of broadcast domains may include logical BDs, virtual BDs, physical BDs or non-virtual BDs. For example, in this context, a physical BD refers to a traditional BD comprising a set of physical devices, in which a physical device is able to communicate with another physical device in the broadcast domain, e.g., as previously explained, without being rerouted. For example, a signal packet may be transmitted from one device in the BD to another device in the BD without being directed or redirected via a router or similar device, such as a device capable of affecting routing of signal packets, for example. In contrast, a virtual BD refers to a BD that includes at least some virtual components within the BD, such as a virtual device, or to a BD in which physical devices are linked, such as via a tunnel server, for example. In this context, the term linked, such as, for example, if used to refer to devices in separate BDs refers to allowing signal packets to communicate between broadcast domains as if the broadcast domains are not separate, but without substantially changing the broadcast domain configuration of the separate broadcast domains. The terms linked and logically joined or similar terms are used interchangeably in this context. Likewise, in this context, a virtual broadcast domain may be generated or created by linking broadcast domains at least for a period of time. A virtual BD operates like a physical BD, however, a virtual device in the BD, for example, is not necessarily associated with the same particular physical devices at all times. For example, a virtual device in the virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device.

A broadcast domain may also be be referred to as a logical broadcast domain (also referred to as LBD). A logical broadcast domain may comprise a virtual broadcast domain and/or a physical broadcast domain. A logical broadcast domain that includes a virtual broadcast domain, for example, may refer to a logical broadcast domain in which spatial confines, so to speak, of at least portions of the broadcast domain may not be entirely related to a particular set of physical devices. That is, for example, some devices in the BD may not be consistently limited or associated with any particular physical devices. Some devices of the broadcast domain, for example, may be logically independent of physical devices, as alluded to above.

Along similar lines, a virtual local area network (VLAN) may, for example, comprise a logical partition or sub-partition of a physical LAN or logically joined (e.g., linked) logical partitions or logical sub-partitions of multiple physical LANs, for example. Likewise, a virtual network may comprise a similar concept in which logical partitions or sub-partitions of LANs, VLANs or virtual broadcast domains, may, for example, in an embodiment, be logically joined (e.g., linked) at least for a period of time. A non-virtual broadcast domain simply is another way to refer to a physical BD since it refers to a broadcast domain in which the broadcast domain devices exclude any virtual devices. Thus, devices in a non-virtual BD may comprise physical devices, such as a router, a computing platform (that includes a computing device, for example), a network device, etc. The term broadcast domain is also used in a generic sense meaning that it is not limited exclusively to a broadcast type of signal packet transmission scheme and may include in addition to and/or in place of a broadcast, other types of signal packet transmission schemes, such as, but not limited to, anycast, broadcast, multicast, unicast, geocast, the like, or any combinations thereof.

As previously indicated, a network device comprises a device capable of communicating via a network. For example, network devices may comprise computing devices, non-computing devices, or other devices. A network device may comprise a router, gateway, hub, switch, host, mobile device, server, client, the like, or any combinations thereof. A server may comprise a network device capable of serving content. For example, a server may provide now known or to be later developed, server arrangements, derivatives, and/or improvements, including past, present, or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

As indicated above, a logical broadcast domain refers to at least a logical division of a network comprising a plurality of network devices such that network devices communicating via the logical division of the network may communicate with other network devices communicating via the logical division without use of a router or other network device capable of limiting network communications. For example, as a non-limiting illustration, a single logical broadcast domain may be constructed using multiple repeaters, hubs, NAT devices, or switches, whereby a network device communicating via one of the multiple repeaters, hubs, NAT devices or switches may communicate with another network device communicating via one of the repeaters, hubs, NAT devices or switches.

In this context, the term logical broadcast domain configuration refers to various hardware devices, firmware, and/or software applications (if residing in one or more locations within a LBD so as to be capable of being accessed or executed electronically) supporting a logical broadcast domain. As used in this specification, a logical broadcast domain configuration, therefore, may include stored signal packets relating to one or more features of a logical broadcast domain, such as representing, characterizing or specifying information, although in physical form, such as signals, related to one or more features, or other stored information, again, in physical form, such as memory states, relating one or more features of a network device communicating via the logical broadcast domain, such as to represent, to characterize or to specify the one or more features.

For example, a broadcast domain configuration may include a subset of, or additions to the following non-limiting illustrative examples of features: one or more network protocols, available addresses, used addresses, topologies, devices used, such as switches or hubs, historical settings, such as for security, for a network protocol, etc., modifications of the foregoing, user accounts, including status, authentication, etc., security settings of a broadcast domain, workgroup or domain names, device names including status, available device features, etc., services available or used, status of the network devices, as well as other features.

One might attempt to address drawbacks of hardware bridges and/or VPN hardware or software, previously discussed, by forwarding signal packets from one broadcast domain to another broadcast domain. However, merely the act of forwarding signal packets without more processing or manipulation, such as without providing signal packet processing or device architecture modifications or adjustments, for example, may add network complexity, traffic and/or expense and, therefore, may not necessarily address one or more drawbacks in a satisfactory manner.

Instead, however, in one example illustrative embodiment, use of a gateway device, for example, may allow network devices communicating via their respective logical broadcast domains, for example, to discover and/or request services available via network devices of another logical broadcast domain while still communicating via their respective logical broadcast domains, potentially with less complexity, traffic or expense than simply implementing signal packet forwarding. In this context, although the term gateway device may be employed to refer to a network device able to link logical broadcast domains via a tunnel server as a matter of convenience, it is understood that any network device may include such a capability, such as, for example, if loaded with software providing an appropriate capability, as described in more detail throughout this specification. Therefore, it is not intended that the term gateway be used in this document to exclusively refer to devices having such capability. Likewise, in this context, the term linking logical broadcast domains refers to allowing signal packets to communicate between logically separate broadcast domains as if the logical broadcast domains are not separate, but without substantially changing the broadcast domain configuration of the separate, logical broadcast domains. The terms linked and logically joined or similar terms are used interchangeably in this context. Likewise, in this context, a virtual broadcast domain may be generated or created by linking logical broadcast domains at least for a period of time. It is also noted that in an embodiment or implementation a logical broadcast domain may comprise a single or remote stand-alone device.

Thus, in one embodiment, devices communicating as part of a virtual broadcast domain, may communicate with devices operating as part of a non-virtual broadcast domain, respectively, for example. In one illustrative embodiment, this may be accomplished via use of a tunnel server linking several gateway devices, for example. A tunnel server may, for example, execute software capable of receiving and sending signal packets from gateway devices in different logical broadcast domains. For example, the different logical broadcast domains may otherwise use separate routers, for example. Typically, therefore, the different logical broadcast domains may occupy separate network address spaces, such as separate IP address spaces, as an example. Therefore, typically, routers may provide network address translation so that signal packets may be properly routed after leaving a particular logical broadcast domain. However, if, for example, the separate routers for the respective BDs include a routing table, or similar mechanism, such that signal packets intended to reach another logical broadcast domain are routed to a tunnel server, in this example embodiment, as a result, network address translation may be by-passed. Thus, gateway devices in separate logical broadcast domains may communicate with a tunnel server. The tunnel server may forward traffic (e.g., signal packet transmissions) between gateway devices, such as for communications between different logical broadcast domains.

Thus, for example, if a virtual broadcast domain provides a signal packet A to tunnel server, it may be encapsulated. Likewise, if a non-virtual broadcast domain provides a signal packet B to a tunnel server it may be encapsulated. However, in this embodiment, a tunnel server may likewise remove encapsulation (e.g., referred to as termination) to determine where to forward a signal packet and re-encapsulate it for forwarding. Likewise, in an embodiment, as a few non-limiting illustrative examples, encapsulation may include encryption as well, or may separate encapsulation from termination. Of course, use of gateway devices and tunnel servers may involve much more complex network transmission and/or routing arrangements as well. The previous description is simplified for purposes of illustration and, therefore, is not intended to be limiting.

In one possible illustrative embodiment, a controller may manage a plurality of respective gateway devices communicating via their respective logical broadcast domains. In still another possible embodiment, a controller may provision one or more tunnel servers, for example, to facilitate communications between network devices communicating as part of different, respective logical broadcast domains (e.g., gateways in respective LBDs may communicate via a tunnel server). Likewise, in still another illustrative embodiment, a controller may comprise a master controller that may be used to manage other controllers, for example, although there may, of course, be more than one or even several master controllers in a particular embodiment.

A tunnel server may be implemented in software, firmware, hardware or a combination thereof (other than software per se, since software is executed, of course). For example, a tunnel server may comprise a software application initiated by a controller, but potentially executed elsewhere, such as on a separate server, for example; although claimed subject matter is not limited in scope in this respect. Furthermore, in another embodiment, a tunnel server may comprise a network device physical, logically, virtually or non-virtually separate from a controller.

Likewise, in an embodiment, a gateway device may comprise a network device capable of communicating as part of a broadcast domain to discover features of another broadcast domain without human intervention, such as, for example, to generate a broadcast domain configuration of another broadcast domain. As described previously, the term gateway is introduced as a matter of convenience; however, it is intended that within this specification any network device may include such a capability. For example, a network device may engage in a variety of activities to accomplish this including, but not limited to any of the following: passively monitoring signal packets, actively probing other network devices, port scanning other network devices, querying other network devices, querying servers, such as a domain controller or other server responsible for a directory of broadcast domain features, any combinations thereof, or other approaches. Thus, although a gateway device may be referred to as a matter of convenience in connection with a broadcast domain, for example, it is to be understood, of course, that a gateway device is provided as merely one illustration of a network device, such as a network device with capability to perform operations as described, for example, discovery, reflection, communication with a tunnel server, operating as a tunnel server, operating as a controller, etc. Likewise, a network device may be implemented virtually (e.g., logically) or non-virtually (e.g., physically). Furthermore, in this context, without human intervention indicates that processes may be executed without human intelligence being on hand or otherwise generally available to make appropriate adaptations or changes, such as, if unanticipated events take place, for example. Throughout this specification, unless otherwise stated, it is intended that a process or processes be interpreted as being executed without human intervention. Thus, such one or more processes may execute satisfactorily to accomplish a particular result, for example, without human intelligence, interaction or direction. Thus, in a sense, such processes at least may be performed automatically, so to speak.

Figure 2:
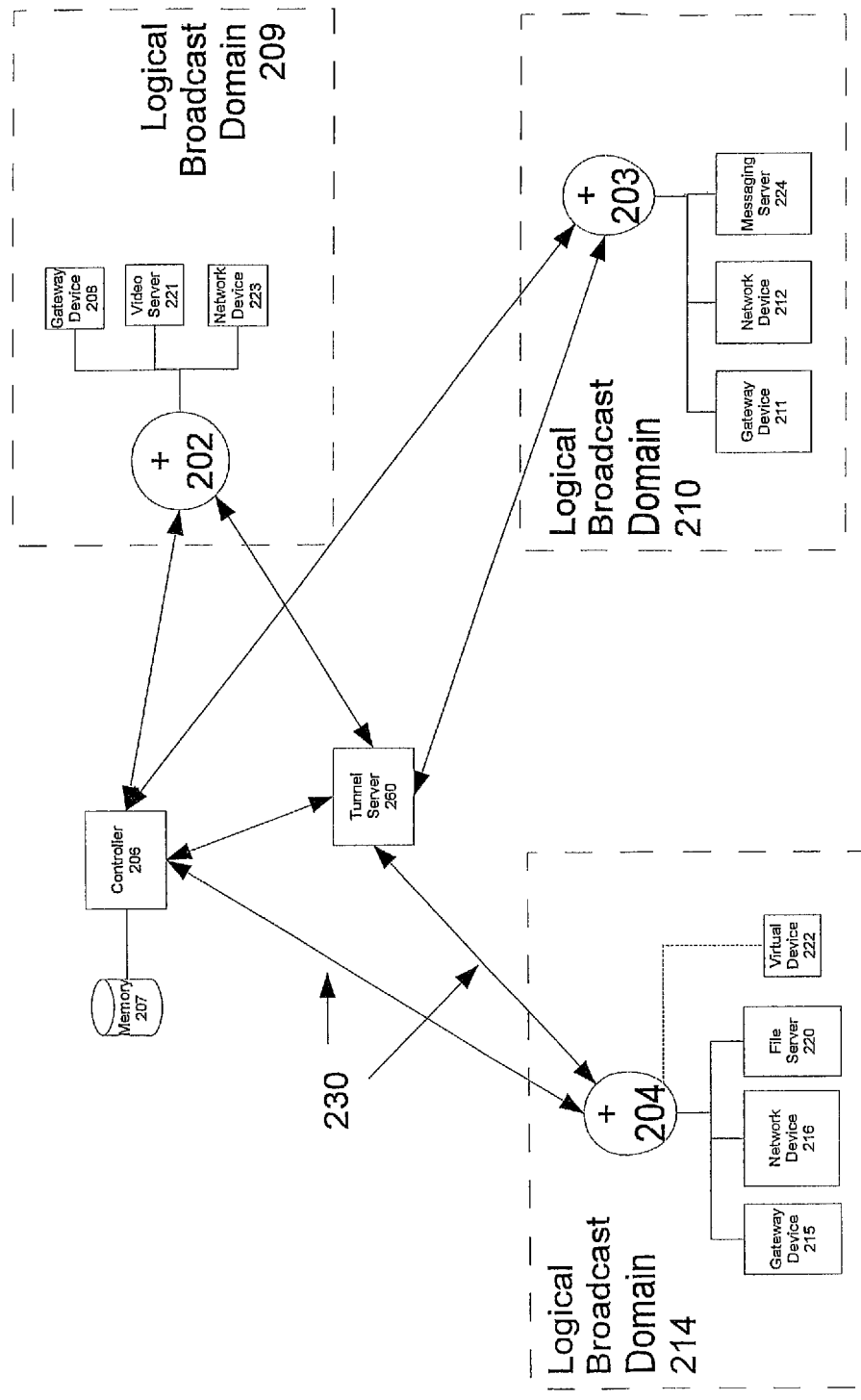
FIG. 2 is a schematic diagram illustrating an embodiment linking more than two logical broadcast domains.

FIG. 2 is a diagram illustrating an embodiment linking more than two logical broadcast domains. LBDs 209, 210 and 214 are illustrated, for example. A controller 206 and a tunnel server 260 are also illustrated, as described in more detail below. In one embodiment, independent logical broadcast domains may exist before a virtual broadcast domain is to be generated via linking LBDs, for example; although "pre-existing" BDs is not intended to be a requirement. Gateway devices (GDs) 215, 211, and 208 may be included within respective LBDs or may be generated or produced, such as, in one example embodiment, through installation of a software application on a network device or through another mechanism. GDs 215 and 211 may communicate with controller 206 in one embodiment. Gateway devices 211 and 215 may, for example, transmit a broadcast domain configuration to controller 206. Likewise, controller 206 may provision tunnel server 260 and may notify gateway devices 211 and/or 215 of a network address for tunnel server 260. Likewise, tunnel server 260 may link logical broadcast domains 214 and 210, in an embodiment. Tunnel server 260 may in another embodiment also link more than two independent logical broadcast domains, such as more than two pre-existing LBDs, for example. Again pre-existing BDs are discussed for illustration purposes, but are not intended as a requirement.

Gateway devices 211 and 215 may transmit signal packets comprising a broadcast domain configuration to tunnel server 260. Tunnel server may forward signal packets, previously received, for example, that may comprise a broadcast domain configuration, such as via forwarding from gateway device 211 to gateway device 215, for example. A tunnel server, such as 260, may also forward signal packets, previously received, for example, that may comprise a broadcast domain configuration, such as forwarding to gateway device 211, for example. A virtual broadcast domain, therefore, may be generated at least for a period of time by linking logical broadcast domain 214 and logical broadcast domain 210, for example.

Depending at least in part on particulars of an embodiment, gateway devices, such as 211 and 215, for example, may, in an embodiment, emulate a received broadcast domain configuration, as shall be explained in more detail infra., and as is discussed, for example, in U.S. patent application Ser. No. 13/543,729, titled "COMMUNICATION BETWEEN BROADCAST DOMAINS," filed on Jul. 6, 2012, by Hankins et al., which is assigned to the assignee of the presently claimed subject matter and is herein incorporated by reference in its entirety; however, these examples, including examples from U.S. patent application Ser. No. 13/543,729, of course, are simply provided as illustrative examples and are not intended to limit claimed subject matter in scope. Gateway devices 211 and 215 may, for example, emulate a received broadcast domain configuration from other sources, such as, but not limited to, controllers, tunnel servers, other gateway devices, etc., for example. In a similar manner, more than two logical broadcast domains may be linked, such as previously mentioned. A gateway device may receive a broadcast domain configuration from a plurality of other gateway devices communicating entirely, primarily or at least partially via other logical broadcast domains, for example.

In one embodiment, as previously disclosed, a controller may initiate instructions, for gateway devices, such as 208, 211, and 215, for example, to communicate with or via a tunnel server, such as 260, for example. Thus, gateway devices 208, 211, and 215 may communicate with or via a tunnel server, such as 260. Gateway device 211 may generate a broadcast domain configuration corresponding to logical broadcast domain 210, for example. Gateway device 208 may generate a broadcast domain configuration corresponding to logical broadcast domain 209, for example.

Gateway devices 208 and 211 may transmit respective generated broadcast domain configuration to controller 206. Controller 206 may forward broadcast domain configurations, such as received from other gateway devices, for example, to gateway device 215. Gateway device 215 may emulate multiple received broadcast domain configurations as part of logical broadcast domain 214. For example, as an illustration, network device 216 may discover network device 223 communicating as part of logical broadcast domain 209 and/or network device 212 communicating as part of logical broadcast domain 210.

Continuing with the embodiment of FIG. 2, as an illustration of one possible scenario, network device 216 may communicate a request, such as by transmitting one or more signal packets, such as to network device 223, for example. Via gateway device 215, for example, one or more signal packets comprising a request may be forwarded from network device 216 to tunnel server 260. Tunnel server 260 may, as a result, forward one or more signal packets, such as to gateway device 208, for example. Gateway device 208 may transmit signal packets via a logical broadcast domain, here 209, for example. Since network device 223 comprises part of logical broadcast domain, it may therefore receive a request that may be viewed as an emulation of a request from network device 216 via the now local logical broadcast domain. Thus, network device 223 may accept the request and respond according to established network protocols in an embodiment, for example. In this illustrative example, a response may likewise be forwarded back via gateway device, 208, and tunnel server 260, to gateway device 215 for emulation as part of logical broadcast domain 214. Gateway device 215 may transmit one or more signal packets via logical broadcast domain 214 indicating an accepted request from network device 223 to network device 216. Thus, network devices 216 and 223 may communicate via a virtual broadcast domain comprising LBDs 209 and 214, in this example, and by-passing NAT implemented by routers, for example. Thus, a private network managed by controller 206 has been illustrated by this example. In an implementation, network devices 216 and 223 may or may not recognize that their transmissions are forwarded via a tunnel server and/or to other logical broadcast domains.

In a similar manner, network device 216 and network device 212 may communicate via a virtual broadcast domain comprising logical broadcast domain 214 and logical broadcast domain 210, for example. A virtual broadcast domain may, for example, comprise logical broadcast domain 209, logical broadcast domain 210 and logical broadcast domain 214 such that network devices on any of the three logical broadcast domains may communicate with other network devices of the other logical broadcast domains included in the virtual broadcast domain, communicating, for example, via respective gateway devices that are part of respective logical broadcast domains. Network devices may or may not recognize that signal packet transmissions may or may not be forwarded via a tunnel server, or that the other network devices may or may not be logically connected via gateway devices that are part of logical broadcast domains. Furthermore, in an embodiment, communication in this manner may be accomplished with off-the shelf, standardly available, state of the art network devices, for example; although, of course, claimed subject matter is not limited to use of off-the-shelf devices.

Transmissions, e.g., signal packets, between logical broadcast domains, in an embodiment, may be forwarded via tunnel server 260 and/or may be stored by tunnel server 260. Signal packet transmissions via a tunnel server, such as 260, for example, may be scanned by the tunnel server. Scanning, in this context, refers to evaluating signal packet transmissions to assess signal content of the signal packet, such as type, source destination, relevant systems, software, support, etc. Scanning may comprise scanning one or more signal packets, for example, for any purpose, such as, for example, virus scanning, adware scanning, malware scanning, forensics scanning, scanning for logging purposes, scanning for any patterns of communications, scanning to assess compliance with particular rules or regulations, scanning for security purposes, scanning to detect existence of other software applications, scanning to discover information, including leaks, etc.

Transmissions, such as signal packets transmissions, for example, between logical broadcast domains via a tunnel server, such as 260, may in an embodiment be altered by the tunnel server, such as 260, as an example. Altering signal packets may take place in any of a host of possible situations, including, as examples, one or more of the following, such as, for example: to compress and/or decompress; to detect and/or correct errors, impossible or infeasible conditions, and/or conditions inconsistent with a network protocol of a logical broadcast domain; to modify properties of a network device communicating via a tunnel server; to conform to other conventions, such as convenience, political correctness, cultural acceptability, filtering vulgarity; for other reasons; or any combination thereof, for example.

In one embodiment, gateway device 215 may generate a broadcast domain configuration based at least in part on signal packets received via broadcast domain 214, such as discovery signal packets. In this context, the term "broadcast domain configuration" refers to various hardware devices, firmware, and/or software applications (if residing in one or more locations within the BD so as to be capable of being accessed or executed electronically) supporting a broadcast domain. As used in this specification, a broadcast domain configuration, therefore, may include stored signal packets relating to one or more features of a broadcast domain, such as representing, characterizing or specifying information related to one or more features, or any other stored information relating to one or more features of a network device communicating via the broadcast domain, such as to represent, to characterize or to specify the one or more features. For example, a broadcast domain configuration may include any subset of, or additions to the following non-limiting illustrative examples of features: network protocols, available addresses, used addresses, topologies, devices used, such as switches or hubs, historical settings, such as for security, for a network protocol, etc., modifications of any of the foregoing, user accounts, including status, authentication, etc., security settings of the broadcast domain, device names including status, available device features, etc., services available or used, status of one or more of the network devices.

In one example, without limitation, gateway device 215 may generate a broadcast domain configuration based at least in part on received signal packets comprising a multicast discovery protocol, such as NBT or NetBT, which refers to NetBIOS over TCP/IP. NBT is specified by the RFC 1001 and RFC 1002 documents available, for example, from the Internet Engineering Taskforce (IETF), at www.ietf.org. NetBIOS provides three distinct services: name service for name registration and resolution, datagram distribution service for connectionless communication, and session service for connection-oriented communication. Generically, the term discovery signal packets or discovery packets refers to signal packets providing this or a similar discovery protocol type functionality or capability. Thus, discovery signal packets compliant or compatible with NBT, for example, may be referred to specifically as NBT packets or NBT signal packets. In another embodiment, WS-Discovery (Web Services Dynamic Discovery, OASIS, available at: http://docs.oasis-open.org/ws-dd/discovery/1.1/os/wsdd-discovery-1.1-spec-os.html), may be employed rather than NBT, for example. Thus, for example, appropriate signal packets may be referred to specifically as WS-discovery signal packets or WS-discovery packets. As yet another example, a gateway device may transmit Internet Control Message Protocol (ICMP) echo request signal packets (ICMP request packets) via a logical broadcast domain. A gateway device, for example, may monitor responses to ICMP request packets to determine reachability of one or more network devices communicating via a logical broadcast domain, for example.

Routers 202, 203, or 204, for example, may route signal packets, such as between logical broadcast domains or to a controller, such as a master controller. Thus, a gateway device 215 may transmit a generated broadcast domain configuration to a controller or a master controller, such as 206. Controller 206 may store a generated broadcast domain configuration received from a gateway device, such as device 215, for example, using a memory device 207. Memory device 207 may comprise a local storage device or a non-local memory device otherwise accessible by controller 206, for example.

In one embodiment, routers 202, 203, or 204 may employ network address translation (NAT). NAT if employed in a network may add a layer of additional complexity for some signal packets that are to be transmitted or received. Typically, routers that employ NAT may modify a signal packet by altering a source address of a source device that may be part of a logical broadcast domain (likewise, a router employing NAT may also modify a destination address). Therefore, a signal packet transmission from a router employing NAT may appear as though the signal packet originated from the router rather than having originated elsewhere. Likewise, network devices on a logical broadcast domain may have an intervening router, or a similar device performing network address translation, for example, between the logical broadcast domain and other networks. Therefore, other portions of a network that have other logical broadcast domains, may not conventionally be accessible to devices operating as part of the other broadcast domains, at least not without some form of network address translation conventionally taking place. Likewise, routers employing NAT also may in some situations not necessarily allow signal packets to traverse a particular logical broadcast domain if the packets originate from outside the particular logical broadcast domain (e.g., not perform signal packets to reach a network device that may be part of the particular LBD). However, in an embodiment, for example, such as implementing a private network, NAT may be by-passed, such as previously described, for example.

In another logical broadcast domain, such as 210, a gateway device, such as 211, may request a generated broadcast domain configuration, such as from a controller 206. Likewise, alternatively, a gateway device, such as 211, may request that a controller, such as a master controller, such as 206, initiate one or more instructions for a gateway device, such as 215, to initiate transmission of a generated broadcast domain configuration, such as in the form of signal packet transmissions. Thus, for example, controller 206 may also initiate its own transmission of one or more generated broadcast domain configurations to gateway device 211, such as in the form of signal packet transmissions.

Gateway device 211 may emulate a generated broadcast domain configuration, such as for broadcast domain 214, received from gateway device 215 or from controller 206, for example, on logical broadcast domain 210. Gateway device 211 may also cease emulating a generated broadcast domain configuration, such as for logical broadcast domain 214 in this example, based at least in part on one or more of the following: one or more instructions from a controller, such as controller 206, manual commands, such as may be entered via a device capable of affecting gateway device 211, network congestion, network errors, or one or more features of a logical broadcast domain, such as those previously disclosed, others or any combination thereof, for example.

Additionally, logical broadcast domain 210 may include gateway device 211. Gateway device 211 may generate a broadcast domain configuration and may transmit the generated broadcast domain configuration to a controller, such as controller 206, or to a gateway device, such as 215. If a generated broadcast domain configuration, for example, is transmitted to controller 206, gateway device 215 communicating as part of logical broadcast domain 214, for example, may request the generated broadcast domain configuration from controller 206 or controller 206 may initiate transmission of the generated broadcast domain to gateway device 215 with or without having received a request. Controller 206 may also initiate transmission, such as in the form of signal packets, for example, of a generated broadcast domain configuration, such as the broadcast domain configuration generated by gateway device 211, for example, as part of another logical broadcast domain, such as 214, for example. Thus, in one embodiment, for example, devices communicating as part of logical broadcast domain 214, and logical broadcast domain 210, may discover each other, communicate with devices communicating as part of other logical broadcast domains, and/or request services available via devices communicating as part of other logical broadcast domains, or via a controller, such as a master controller, for example.

As discussed previously, in an embodiment, a virtual broadcast domain may comprise logical broadcast domain 214, and logical broadcast domain 210. Therefore, network device 216, communicating as part of logical broadcast domain 214, may discover and/or request services from a messaging server 224, communicating as part of logical broadcast domain 210. Also, network device 212, communicating as part of logical broadcast domain 210, may discover and/or request services from a file server 220, communicating as part of logical broadcast domain 214. Of course, claimed subject matter is not limited in scope to example embodiments, such as the foregoing provided for illustrative purposes, for example.

Although claimed subject matter is not limited in scope in this respect, in an embodiment, a potential feature may include centralized management, such as, for example, of a broadcast domain, and/or multiple broadcast domains, despite, for example, the distributed nature of devices in the respective BDs, such as with intervening independently managed network devices, as occurs in connection with the Internet, as one example. For example, a controller, such as controller 206, may receive broadcast domain configurations from other gateway devices communicating via other logical broadcast domains, whereby more than two logical broadcast domains may be similarly linked such that devices communicating via one of a plurality of logical broadcast domains, may discover and/or request services available via devices communicating via another of the plurality of logical broadcast domains. For example, controller 206 may also receive a broadcast domain configuration from gateway device 208, communicating via logical broadcast domain 209. Controller 206, may also forward other received broadcast domain configurations from logical broadcast domains 214, or 210, for example, to logical broadcast domain 209, for example, to be emulated via gateway device 208 or otherwise emulated.

In another illustrative embodiment, network device 212, communicating as part of logical broadcast domain 210, may discover and request services, such as from a video server 221, for example. Video server 221 may, for example, comprise a network device capable of communicating signal packets comprising a video signal. Video server 221 may, for example, have a capability to record video from a device capable of generating video, including storage in local memory, a capability to manage a directory of available video signals, a capability to edit stored videos, and/or a capability to transmit a stored video via a broadcast domain, such as in the form of signal packets, for example.

Referring to FIG. 2, as previously discussed, a broadcast domain configuration may include devices communicating via a virtual private network (VPN), for example. In this context, a VPN refers to a mechanism in which a remote host, such as a network device, communicates with a VPN server to encrypt a communication stream in a manner so that the remote host is able to reasonably securely communicate with other devices of the broadcast domain and in which an intervening router has a configuration that allows the remote host to initiate the VPN even with network address translation being implemented. A device communicating via a VPN, such as virtual device 222, may connect to logical broadcast domain 214, or disconnect from logical broadcast domain 214. A gateway device 215, may update a generated broadcast domain configuration based at least in part on a communication state of virtual device 222, for example, and may forward an update, such as of a broadcast domain configuration, to a controller, such as 206, and/or to a gateway device.

In another embodiment, gateway device 215 may initiate routing of a generated broadcast domain configuration. For example, gateway device 215 may initiate transmission of a generated broadcast domain configuration to a router that may forward the generated broadcast domain configuration, for example, to ultimately arrive at a controller, such as 206, or elsewhere. Routing may occur via wireless or wired communication mediums 230, for example. A controller, such as 206, may alternately, for example, access a generated broadcast domain configuration from a memory 207, which may or may not be local. For example, this may be desirable if a controller 206 is reset, or otherwise reloads one or more generated broadcast domain configurations, for example. In another embodiment, controller 206 may generate a broadcast domain configuration based at least in part on a stored (e.g., previously generated) broadcast domain configuration and modifications entered manually from an input device, such as a keyboard or mouse, for example. A generated broadcast domain configuration may, for example, be altered using modifications entered manually via an input device, such as a keyboard, for example, to a controller, such as 206, for example. In another embodiment, a broadcast domain configuration may be modified via manually entered changes effected via an input device, such as a mouse, at gateway device, such as 216, for example.

In one embodiment, controller 206, may forward a generated broadcast domain configuration with or without receiving one or more initiating signals, such as from gateway device 211, for example. Thus, in an embodiment, for example, a controller, such as 206, may periodically, intermittently or asynchronously, etc., for example, forward one or more generated broadcast domain configurations based at least in part on currently communicating network devices, for example. Additionally, a linking table or other mechanism may specify forwarding rules or the like to, for example, implement linking between logical broadcast domains, for example, forming a virtual broadcast domain, for example, via a tunnel server, such as previously described. In another embodiment, controller 206 may transmit a portion (e.g., digest or subset) of a generated broadcast domain configuration. For example, in an embodiment, a generated broadcast domain configuration may comprise a selection of a set or subset of features of a logical broadcast domain 210 to be forwarded, such as to one or more gateway devices, for example, by a controller, such as 206.

As previously mentioned, although claimed subject matter is not limited in scope in this respect, in an embodiment, a potential feature may include centralized management, such as, for example, of a broadcast domain, and/or multiple broadcast domains, despite, for example, the distributed arrangement of devices comprising a BD, in which intervening independently managed devices may be present, such as occurs with Internet type connectivity, for example. In one embodiment, for example, a tunnel server, such as tunnel server 260, shown in FIG. 2, for example, may be employed to also perform functions of a controller. Tunnel server 260 may, for example, receive a broadcast domain configuration. Tunnel server 260 may forward one or more broadcast domain configurations to one or more gateway devices. Tunnel server 260 may forward one or more broadcast domain configurations based at least in part on currently communicating network devices or otherwise, for example, such as stored BD configurations, as another example. Additionally, a linking table or other mechanism, for example, may specify forwarding rules or the like, to, for example, specify linking or additional functionality, such as between logical broadcast domains, for example, to form a virtual broadcast domain. In another embodiment, tunnel server 206 may transmit a portion (e.g., digest or subset) of a generated broadcast domain configuration. For example, in an embodiment, a generated broadcast domain configuration may comprise a selection of a set or subset of features of a logical broadcast domain 210 to be forwarded, such as to one or more gateway devices, for example, by tunnel server 260, operating as a controller, in this illustrative example.

In an embodiment, emulation may comprise, for example, a first network device simulating another network device via a broadcast domain. Another network device, in this example, may comprise a physical network device, or a virtual network device. Therefore, the emulated device may not exist as a physical piece of hardware, although it is executed or stored on a physical device, of course. an emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a logical broadcast domain without forwarding requests to another network device. Additionally, emulation, in an embodiment, may comprise imitating another network device. However, another network device may exist virtually, and/or may comprise a set instructions being executed via another network device. Although services may appear to be available via a network device, the network device may, therefore, in an embodiment, comprise a virtual network device.

In a possible example embodiment, a gateway device may receive signal packets from a remote network device, for example. A tunnel server, for example, may forward signal packets, such as the example illustrated by FIG. 1, discussed below. Thus, a private network between a remote network device and a logical broadcast domain may be generated without human intervention by linking the logical broadcast domain and the remote network device. One might view a remote network device (e.g., a stand-alone network device) as forming its own logical broadcast domain. If viewed in this way, another example of linking two broadcast domains is provided.

FIG. 1 is a diagram illustrating an embodiment 100 linking a remote network device 120 and a logical broadcast domain 101. In this embodiment, linking may occur via a tunnel server 110, operating in this illustrative example, in effect, to form a private network capable of being managed. Tunnel server 110 comprises a remote network device, which may include a capability to perform other operations in alternative embodiments, such as a controller (e.g., a master controller), as indicated in the figure by the use of "TS/MC," discussed in more detail below. In this context, the term remote refers to a device not necessarily being part of a particular broadcast domain (unless, as suggested previously, the remote device itself forms a broadcast domain). A broadcast domain 101 may include a gateway device 130. Gateway device 130 may generate a broadcast domain configuration and may transmit a generated broadcast domain configuration, for example, to a tunnel server, such as 110. Gateway device 130 as part of generating a broadcast domain configuration may, for example, assemble without human intervention a list of devices capable of communicating via broadcast domain 101. Gateway device 130 may assemble without human intervention a list of services available via broadcast domain 101 as well as other features of broadcast domain 101. A generated broadcast domain configuration may be communicated to a tunnel server, such as 110, in a manner transparent to router 150, for example, such as an approach previously described in connection with FIG. 2, for example.

Tunnel server 110 may also comprise a master controller, for example, in an embodiment, (e.g., TS/MC 110) mentioned previously, and may, for example, receive a generated broadcast domain configuration and may forward without human intervention the generated broadcast domain configuration to another network device, such as 120, for example. A broadcast domain configuration having been generated and forwarded to network device 120 may enable network device 120 to discover network device 131, communicating as part of logical broadcast domain 101. Thus, network device 120 may comprise a broadcast domain comprising one device, here, a remote, stand-alone network device 120. After discovering devices and communicating a generated broadcast domain configuration for logical broadcast domain 101, and forwarding to remote network device 120, remote network device 120 may communicate with network device 131 and may request use of one or more services that may be provided by network device 131. For example, network device 131 may share a printer whereby remote network device 120 may print documents via network device 131, or may use any number of other services that may be included in a forwarded broadcast domain configuration. Network device 140 may also share other services whereby remote network device 120 may concurrently request use of services from both network device 131 and network device 140, for example.

Remote network device 120 may request to be in communication with gateway device 130 via TS/MC 110. TS/MC 110 may notify gateway device 130 of the request. Gateway device 130 may be in communication with remote network device 120, although an intervening network device, such as a router 150, may be independently managed. Network device 150 may also comprise and/or execute an independently managed firewall. Thus, as an intervening network device, and although an independently managed firewall, signal packet transmissions may pass through (e.g., via) 150 between device 130 and device 120, for example. Network device 150 may also comprise a NAT router. Nonetheless, gateway device 130 may be in communication with network device 120 irrespective of the configuration of the intervening independently managed network device 150. Operating as a tunnel server, TS/MC 110 may perform encapsulation and termination, as mentioned previously, for example. Also, as mentioned previously, encapsulation, for example, may permit bypassing network address translation, as performed by router 150, for example. Network 160 may comprise a network, such as the Internet, for example, as previously disclosed. Communication mediums 170 and/or 171 may comprise wired or wireless, or any combination thereof, as previously disclosed, for example. Logical broadcast domain 101 may comprise a virtual broadcast domain and/or a non-virtual broadcast domain, as previously discussed.

TS/MC 110, operating as a master controller, may be used to manage the private network previously mentioned for this example, e.g., including gateway devices, such as gateway device 130. A controller or master controller may, for example, communicate with gateway devices and may transmit one or more transmissions, such as signal packet transmissions, for example, to initiate generation, transmission or ceasing operations regarding one or more broadcast domain configurations, as well as other operations. Likewise, a master controller, such as 110, for example, may instruct a gateway device to initiate emulation or cease operations regarding one or more broadcast domain configurations, as well as other operations. In a network comprising more than two broadcast domains, a master controller, for example, may initiate instructing gateway devices to forward transmissions relating to one or more generated broadcast domain configurations to one or more other gateway devices. As mentioned previously, for example, in an embodiment, a feature, such as for one or more private networks, such as a broadcast domain including devices distributed within a larger network, such as the Internet, for example, may comprise centralized management of the one or more private networks.

Figure 3:
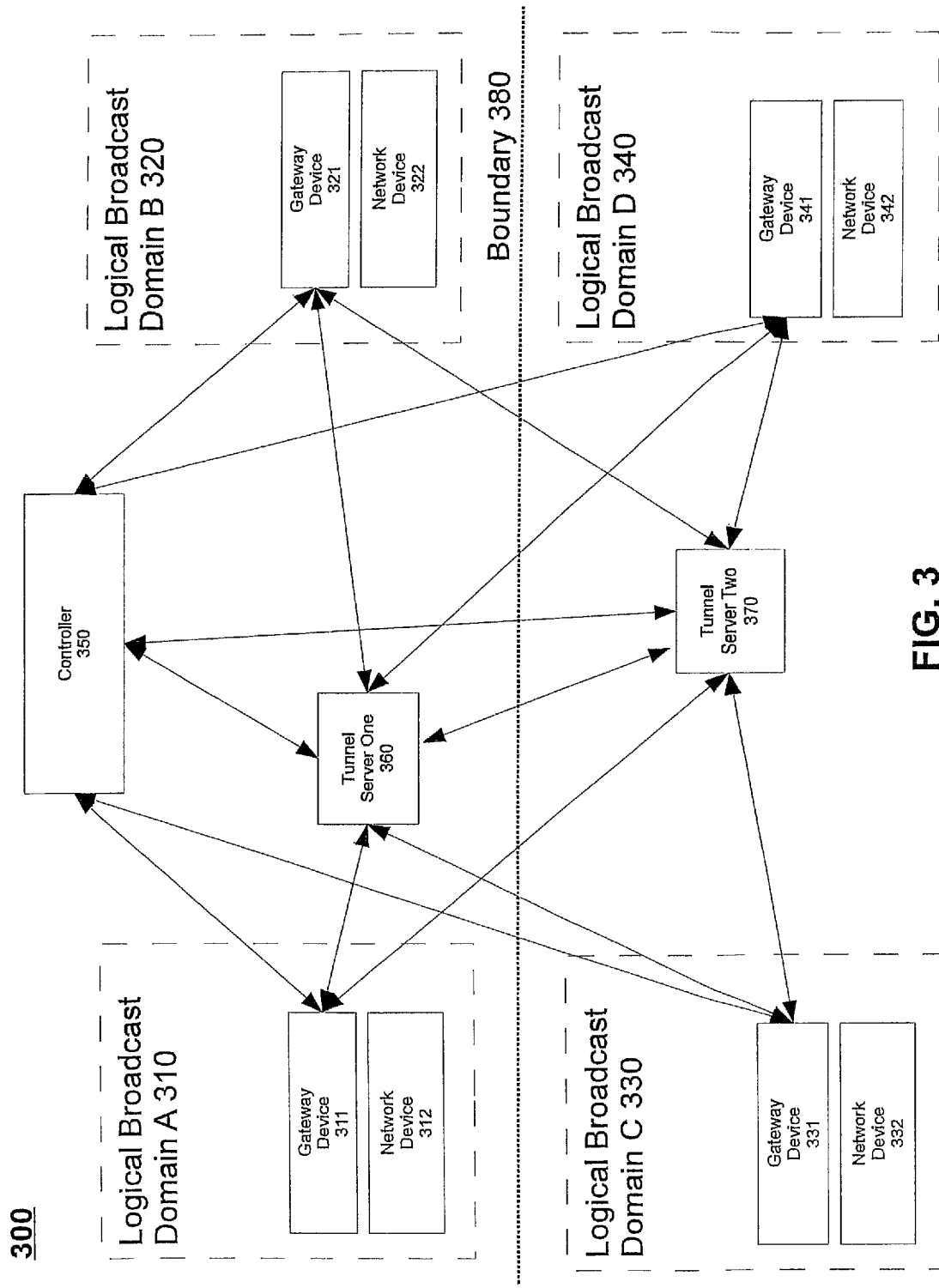
FIG. 3 is a schematic diagram illustrating an embodiment linking logical broadcast domains using more than one tunnel server.

In an embodiment, more than one tunnel server may be employed to link a plurality of logical broadcast domains to form a virtual broadcast domain, although, of course, claimed subject matter is not limited in scope in this respect. FIG. 3 is a schematic diagram showing an embodiment with more than one tunnel server in one illustrative non-limiting example. In one embodiment, for example, four logical broadcast domains may be in communication via more than one tunnel server. Gateway devices 311, 321, 331, and 341 may generate a broadcast domain configuration for their respective logical broadcast domains, for example. Gateway devices 311, 321, 331, and 341 may forward respective broadcast domain configurations to controller 350. Controller 350 may provision tunnel server one, shown as 360. Controller 350 may initiate instructions to gateway devices 311, 321, 331, and 341 to communicate with tunnel server one 360. Gateway devices 311, 321, 331, and 341 may therefore initiate communications, such as via signal packet transmissions, for example.

In one embodiment, logical broadcast domain A 310, and logical broadcast domain B 320 may be located within a similar geographic boundary, such as, the same building, the same city, the same state, the same country, the same continent, the same planet, or other, for example. In an embodiment, logical broadcast domain C 330, and logical broadcast domain D 340, may reside in another geographic region different from the geographic region where logical broadcast domain A 310 or logical broadcast domain B may reside. In one embodiment, for example, logical broadcast domain A 310 and logical broadcast domain B 320 may be physically located in Los Angeles, Calif., U.S.A, while logical broadcast domain C 330 and logical broadcast domain D 340 may be physically located in New York City, N.Y., U.S.A. Of course, these are simply examples for illustration and are not meant to be limiting in any way. Also, in this example, for ease of illustration, the BDs are assumed to be physical BDs; however, claimed subject matter is, of course, not limited in this respect.

In this embodiment, tunnel server one 360, may also be physically located in Los Angeles, Calif., U.S.A. so that transmissions (e.g., signal packets) between logical broadcast domain C 330 and logical broadcast domain D 340 (e.g., communicating via tunnel server one 360, located in Los Angeles), may be transmitted to Los Angeles, and back to New York.

A path or channel for communications may potentially be enhanced by controller 350 provisioning an additional tunnel server located more physically proximate to logical broadcast domain C 330 and logical broadcast domain D 340, for example. Controller 350 may provision tunnel server two 370. Controller 350 may therefore initiate instructions to gateway devices 311, 321, 331, and 341 to additionally initiate communications with tunnel server two 370, while also continuing to be in communication with tunnel server one 360, for example. Gateway devices 311, 321, 331, and 341 may thus initiate communications to tunnel server two 370. Furthermore, in an embodiment, although claimed subject matter is not limited in scope in this respect, transmissions, such as signal packet transmissions may take place between tunnel servers, such as 360 and 370, in this example.

Provisioning an additional tunnel server may be based at least in part on a variety of factors or considerations. For example, signal packets communicated via tunnel server one 360 may be a factor or a consideration. Provisioning an additional tunnel server may likewise be based at least in part on signals from a controller, other than controller 350, for example. Likewise, gateway devices may optionally communicate with other gateway devices, such as via tunnel server one or tunnel server two, for example, depending at least in part on a host of possible factors, such as, geography, latency, availability, efficiency, cost, etc.

As an example, gateway device 311 may transmit signal packets to gateway device 321. Gateway device 311 may transmit signal packets via tunnel server one 360 since tunnel server one 360 is more proximate to both gateway device 311 and gateway device 321 in this example. In another embodiment, gateway device 311 may transmit signal packets via tunnel server two 370, such as if tunnel server one may be unavailable, for a variety of reasons, such as, but not limited to one or more of the following situations: a software issue, a configuration issue, a power issue, scheduled maintenance, insufficient permissions, a security issue, other issues, or combinations thereof.

Likewise, a variety of factors or considerations may likewise affect signal packet transmissions between already provisioned tunnel servers, such as 360 and 370, for example, in an embodiment. As a simple illustrative example, not meant to limit claimed subject matter, a tunnel server in Europe may communicate with a tunnel server in the United States to pass signal packet transmissions, such as from a broadcast domain in Europe to a broadcast domain in the United States; however, respective broadcast domains in Europe may communicate via the tunnel server in Europe while respective broadcast domains in the United States may communicate via the tunnel server in the United States. For example, again, without intending to limit claimed subject matter, it may be that latency is potentially reduced in comparison with using only either the tunnel server in Europe or only the tunnel server in the United States to pass signal packet transmissions from a broadcast domain in Europe to a broadcast domain in the United States. Of course, communications may also take place between more than two tunnel servers in an embodiment.

In still another example implementation involving more than two tunnel servers, for a stream of successive signal packets to be communicated between two broadcast domains, the signal packets may be communicated using more than one tunnel server in a manner so that immediately successive signal packets have a signal communication path that includes different tunnel servers. As one non-limiting example, first broadcast domain may communicate signal packet transmissions to a second broadcast domain using a plurality of tunnel servers in a manner so that, for example, for N tunnel servers, where N is an integer greater than one, every Nth signal packet from the first broadcast domain may be transmitted to the second broadcast domain via the Nth tunnel server. Likewise, of course, every Nth signal packet from the second broadcast domain may be transmitted to the first broadcast domain via the Nth tunnel server; however, the Nth tunnel server from the first BD to the second BD may not necessarily correspond to the Nth tunnel server from second BD to the first BD. Of course, other approaches of distributing signal packet transmissions across multiple tunnel servers are also intended to be included. Implementations in which multiple tunnel servers are employed may offer a variety of potential benefits, although claimed subject matter is not necessarily limited in scope to implementations having these benefits. For example, security may be enhanced. Likewise, improved fault tolerance, redundancy and/or load balancing of tunnel servers may also be accomplished.

In one embodiment, tunnel server one 360, may specialize in file serving, and tunnel server two 370 may specialize in message serving. In an embodiment, gateway device 331, transmitting signal packets comprising file serving, may do so via tunnel server 360 or tunnel server 370. In general, a plurality of gateway devices may communicate with a plurality of tunnel servers. For example, provisioning additional tunnel servers may as one possible consideration, potentially enhance communications by providing alternate paths between gateway devices communicating as part of other logical broadcast domains that may be linked via tunnel servers. Nonetheless, one or more networks of logical broadcast domains and tunnel servers may be generated based at least in part on a host of considerations, such as, for example, cost, capability, efficiency, compatibility, resources, proximity, others or combinations thereof. In one embodiment, network device 312 may communicate with or access network device 322, such as using gateway devices 311 and 321 communicating via tunnel server one 360, for example. Network device 322 may communicate with or access network device 342, such as using gateway devices 311 and 341 communicating via tunnel server two 370, for example. Gateway device 311 may also communicate via tunnel server one 360 and via tunnel server two 370, concurrently.

In an embodiment, a tunnel server may, for example, store one or more service requests, such as in local memory. In an embodiment, if multiple network devices request similar services, a tunnel server may provide service, or a response to a service request to a requesting network device perhaps without forwarding the service request to a network device able to initiate service, for example; however, this may vary at least in part on particulars of a situation and/or an embodiment, for example.

Additionally, in an embodiment, a tunnel server may acknowledge receipt of one or more signal packets before arrival at a destination network device. For example, in one embodiment, network device 332 may transmit a file, or other large amount of stored information states, for example, to network device 322, such as via tunnel server one 360. In an embodiment, tunnel server one may acknowledge receipt of one or more signal packets before network device 322 acknowledges receipt of the one or more signal packets, for example. This may accelerate transmissions. For example, network device 322 may receive acknowledgement of one or more signal packets, and transmit subsequent signal packets with less delay as a result, for example, potentially improving wide area network communications, for example A tunnel server may also replicate services available via other network devices. In this context, replication comprises reading and writing stored information states. Replication may be desirable for a variety of reasons, including, improved consistency between two or more redundant resources, such as software or hardware components, improved reliability, improved accessibility, improved fault tolerance, or combinations thereof. Replication may comprise storage replication, and/or replication of computational tasks, or may comprise active or passive replication as is known in the art.

In one embodiment, tunnel server two 370, may store network communications. Network device 322 may comprise a file server, for example. Network device 312 may request file services from file server 322 via tunnel server two 370. Network device 312 may receive requested services. Subsequently, network device 332 may request similar file services from file server 322 via tunnel server two 370. Tunnel server two 370, having stored previous requests for file service, for example, may respond by providing a requested file service, without necessarily communicating a request to file server 322. A tunnel server may, for example, in an embodiment, potentially provide a faster response by storing previous service requests, referred to here as caching the previous service requests. In another example embodiment, network device 342 may comprise a database server. Tunnel server 370 may replicate the database of database server 342. In an embodiment, if a network device were to request database services from database server 342, via tunnel server two 370, tunnel server two 370 may respond, for example, without necessarily communicating with database server 342.

Figure 4:
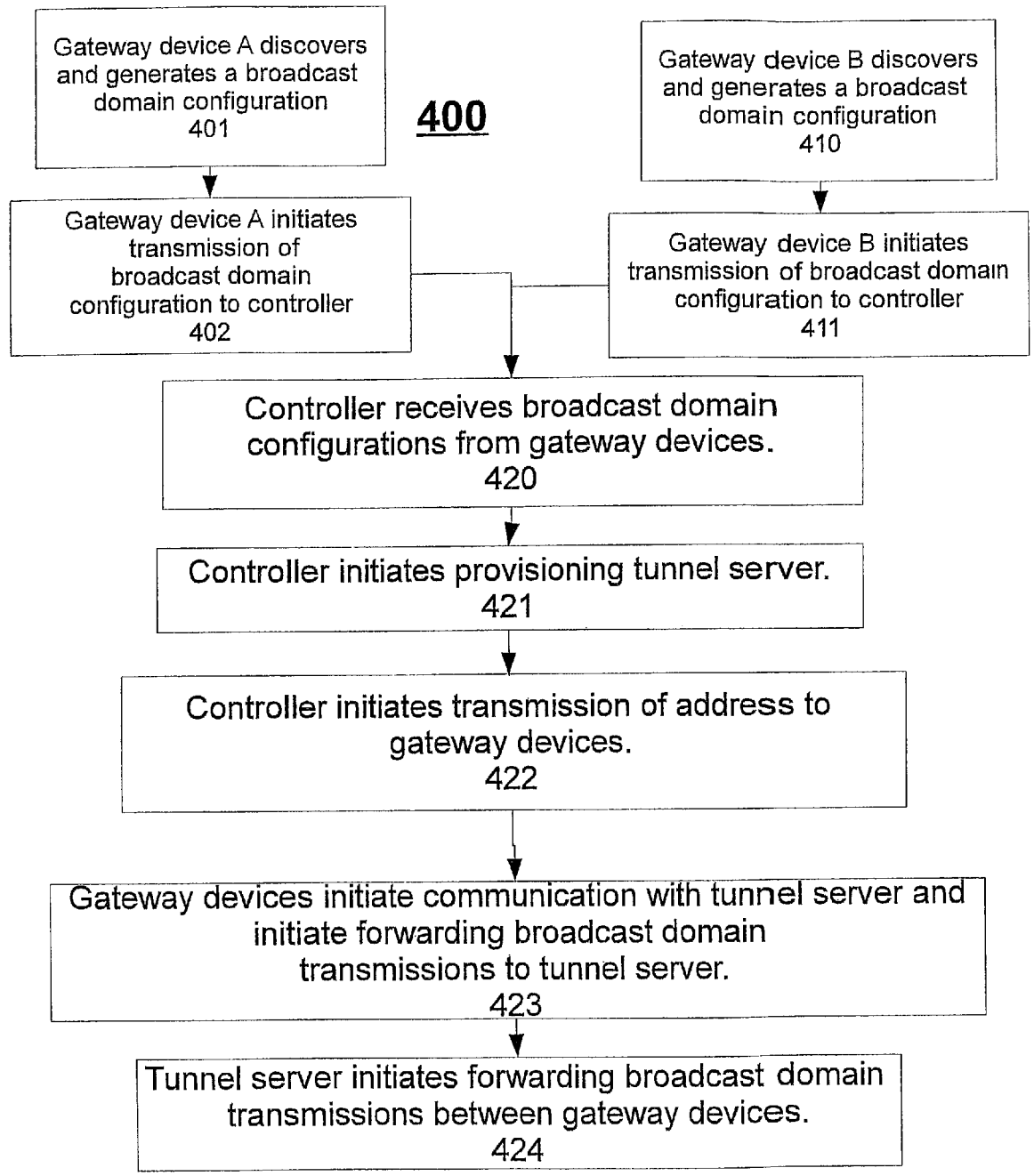
FIG. 4 is a flowchart illustrating an embodiment of a method of linking two or more logical broadcast domains.

FIG. 4 is a flowchart illustrating an embodiment of a method of communication between broadcast domains. Of course, claimed subject matter is not limited in scope to the particular order or arrangement of blocks shown. Likewise, additional or replacement blocks may be included in an embodiment, such as blocks depicting one or more operations in place of those shown may be used in an embodiment, for example.

Referring to FIG. 4, gateway devices A and B may be included as part of separate logical broadcast domains in an example embodiment. As shown by block 401, gateway device A may discover and generate a broadcast domain configuration without human intervention, as part of a logical broadcast domain, for example. As shown by block 410, gateway device B may likewise discover and generate a broadcast domain configuration as part of a logical broadcast domain, for example. At block 402, gateway device A may initiate transmission of a generated broadcast domain configuration, such as in the form of signal packets, for example, to a controller or a master controller. At block 411, gateway device B may initiate transmission of a generated broadcast domain configuration, such as in the form of signal packets, for example, to a controller or a master controller. At block 420, a controller may receive one or more generated broadcast domain configurations from one or more gateway devices, such as A and/or B, for example. FIG. 4 shows an embodiment including the blocks described above as well as the blocks described immediate below, starting with block 421. However, likewise, in an embodiment, a flowchart of provisioning a tunnel server may begin with block 421. Of course, as indicated above, claimed subject matter is not limited in scope to the particular order or arrangement of blocks shown. Likewise, additional or replacement blocks may be included in an embodiment, such as blocks depicting one or more operations in place of those shown may be used in an embodiment.

Referring to block 421, for example, a controller may initiate provisioning of one or more tunnel servers, such as for device A and/or device B, for example. At block 422, a controller may initiate transmission of one or more network addresses for one or more tunnel servers to gateway device A and/or gateway device B, for example. At block 423, gateway devices A and/or B may initiate communication with one or more tunnel servers, for example, via one or more network addresses for the respective one or more tunnel servers, for example. At block 424, one or more tunnel servers may receive signal packets and may initiate forwarding signal packets, such as between devices, such as A and/or B, for example.

Figure 5:
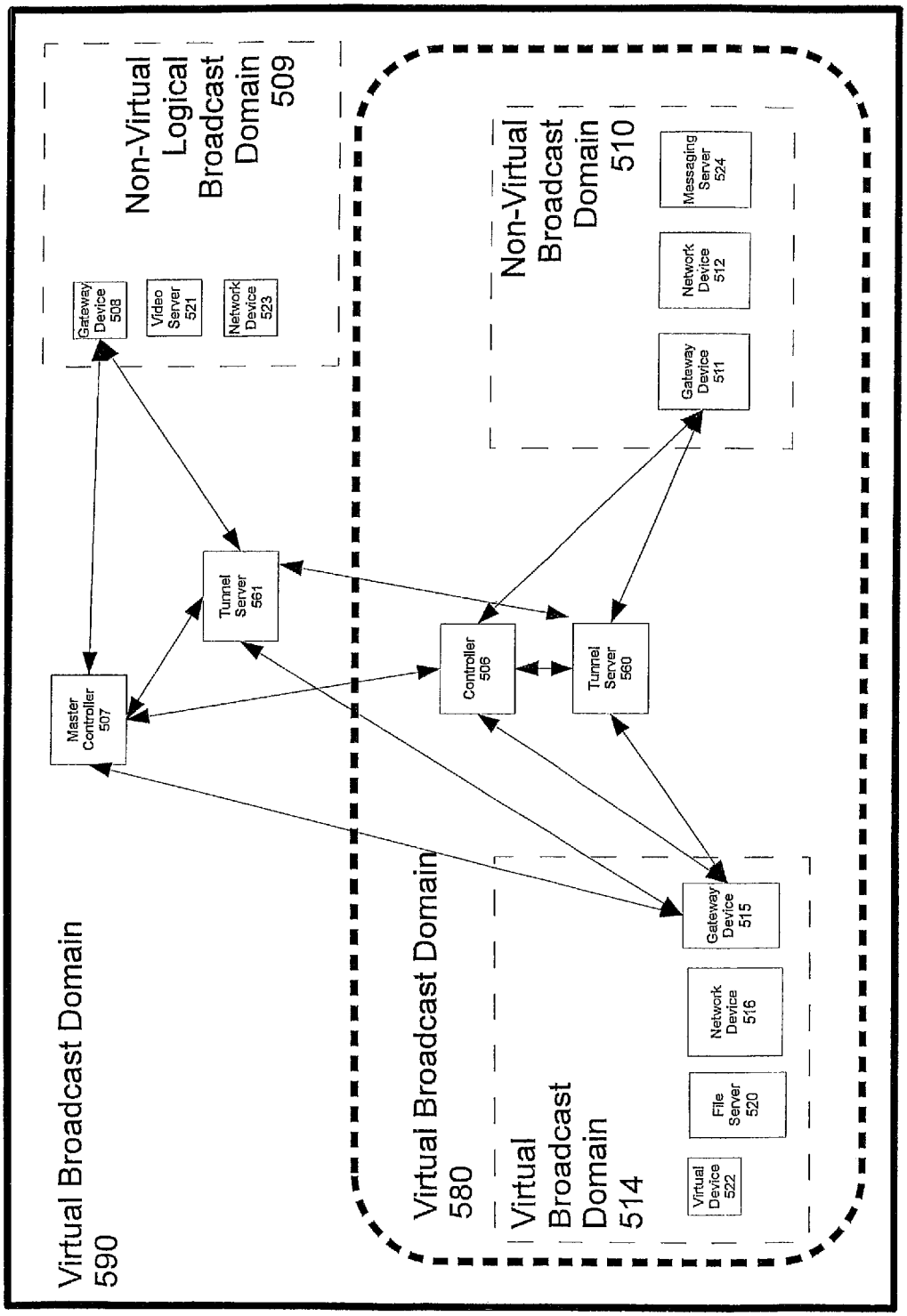
FIG. 5 is a schematic diagram illustrating another embodiment of a virtual broadcast domain comprising two or more logical broadcast domains.

FIG. 5 is a schematic diagram illustrating still another embodiment 590 of a virtual broadcast domain comprising a plurality of logical broadcast domains. In one embodiment, respective gateway devices (e.g., 511, 515) may generate respective broadcast domain configurations and may, for example, initiate transmission to a controller, such as 506, for example, via a router. That is, it is not necessarily required that a tunnel server always be employed, such as, for example, if network devices are directly network addressable, such as via an IP address, for example.

Respective gateway devices (e.g., 511, 515) may request from a controller, such as 506, broadcast domain configurations of other logical broadcast domains and may emulate the generated broadcast domain configurations via the respective logical broadcast domains of which the respective gateway devices may be a part. Likewise, a gateway device may, instead, request that a controller, for example, instruct a gateway device to initiate transmission of a generated broadcast domain configuration to a requesting gateway device. In one embodiment, gateway device 515 may, for example, request a generated broadcast domain configuration from controller 506 corresponding to non-virtual broadcast domain 510, for example. Likewise, gateway device 511 may request a generated broadcast domain configuration from controller 506 corresponding to virtual broadcast domain 580.

In one embodiment, devices communicating as part of virtual broadcast domain 514 may communicate with devices operating as part of non-virtual broadcast domain 510. In one illustrative embodiment, this may be accomplished via a tunnel server, such as 560. Tunnel server 560 may, for example, execute software capable of receiving and sending signal packets from network devices in different logical broadcast domains that may otherwise use separate routers, for example. If, for example, the separate routers include a routing table or similar mechanism such that signal packets intended to reach another logical broadcast domain are routed to a tunnel server, such as 560, then, in this example embodiment, as a result, network address translation may be by-passed. Thus, network devices may communicate with tunnel server 560 and tunnel server 560 may forward traffic between devices, such as on different logical broadcast domains.

Thus, for example, if virtual broadcast domain 514 provides a signal packet A to tunnel server 560, it may be encapsulated. Likewise, if non-virtual broadcast domain 510 provides a signal packet B to tunnel server 560, it may be encapsulated. However, in an embodiment, a tunnel server may remove encapsulation (e.g., referred to as termination) to determine where to forward a signal packet and re-encapsulate it for forwarding so that it may be routed via intermediate network devices. Likewise, in an embodiment, as a few non-limiting illustrative examples, encapsulation may include encryption as well, or may separate encapsulation from termination.

In an embodiment, tunnel server 560 may be controlled at least in part by a controller 506. For example, tunnel server 560 may be instructed to forward network transmission signal packets from gateway device 515 to gateway device 511, and forward network transmission signal packets from gateway device 511 to gateway device 515, for an embodiment, for example. For an embodiment, gateway device 515 in virtual broadcast domain 514 and gateway device 511 in non-virtual broadcast domain 510 may be linked for at least a period of time, in this example, by tunnel server 560, resulting in a path for signal packet communications between gateway device 515 and gateway device 511 and thereby forming a virtual BD, at least for a period of time.

Signal packets from gateway device 515 may comprise signal packets transmitted via virtual broadcast domain 514 from network device 516, and signal packets from gateway device 511 may comprise signal packets transmitted via non-virtual broadcast domain 510 from network device 512. Gateway devices forwarding signal packets, or variations thereof, as part of respective logical broadcast domains, for example, may allow other network devices communicating as part of the respective logical broadcast domain to communicate with network devices in different, other logical broadcast domains as if part of a single logical broadcast domain but without a change in configuration etc. for the participating logical broadcast domains, referred to here as forming a virtual broadcast domain.

In an embodiment, network device 516 may access and/or communicate with messaging server 524, and network device 512 may access and/or communicate with file server 520. Additionally, a virtual device 522, via a traditional VPN in this example in communication with virtual broadcast domain 514, may access and/or communicate with network devices communicating as part of non-virtual broadcast domain 510, such as network device 512, or messaging server 524, for example. No additional configuration changes or modifications are necessarily involved to accomplish such as result beyond those to communicate with virtual broadcast domain 514. In an embodiment, such as this example, a virtual broadcast domain 580, may be generated at least for a period of time by linking virtual broadcast domain (e.g., a logical broadcast domain) 514 with non-virtual broadcast domain (e.g., a logical broadcast domain) 510.

Tunnel server 560 may likewise receive signal packets from devices communicating as part of other logical broadcast domains. For example, tunnel server 560 may receive signal packets from gateway device 515 communicating as part of virtual broadcast domain 514, and also from gateway device 511 communicating as part of non-virtual broadcast domain 510. Tunnel server 560 may receive signal packets from gateway device 515 and forward signal packets to gateway device 511, for example. Tunnel server 560 may also receive signal packets from gateway device 511 and forward signal packets to gateway device 515, for example. In an embodiment, this may allow gateway device 515 and gateway device 511 to communicate, in this example, bypassing for the respective broadcast domains execution or implementation of NAT by routers, or another or similar address modification technique, for example.

In another embodiment, virtual broadcast domain 514 may employ a different network protocol than non-virtual broadcast domain 510, such as a different network discovery protocol, for example. In one embodiment, a controller, such as controller 506, may translate a generated broadcast domain configuration, such as by modifying network transmission signal packets comprising the generated broadcast domain configuration for virtual broadcast domain 514 so as to be substantially compatible with or substantially complaint with non-virtual broadcast domain 510, such as, for example, its particular network discovery protocol. In another embodiment, a controller may initiate a gateway device to modify a generated broadcast domain configuration, such as for virtual broadcast domain 514, for example, so as to be substantially compatible with or substantially compliant with non-virtual broadcast domain 510, such as, for example, its particular network discovery protocol. Likewise, rather than being initiated, such as by a controller, perhaps a difference in protocol, such as a network discovery protocol, may be detected, such as by a gateway device and, with or without being initiated, a gateway device may translate features, such as discovery related features, of the generated broadcast domain configuration in an embodiment. For example, in one illustrative embodiment, devices communicating as part of virtual broadcast domain 514 may perform discovery via WS-Discovery, previously referenced, and devices communicating as part of non-virtual broadcast domain 510 may do so via Bonjour, available from Apple Inc., Cupertino, Calif., see, for example, https://developer.apple.com/bonjour/. Thus, a gateway device may, for example, convert a generated broadcast domain configuration from WS-Discovery to Bonjour for substantial compliance or substantial compatibility within logical broadcast domain including gateway device. Of course, this is merely an illustrative embodiment and claimed subject matter is not limited in scope to illustrative embodiments.

In this context, 'IPv4' refers to using signal packets substantially compatible or substantially compliant with Internet Protocol version 4, also referred to as IPv4 signal packets in this context. IPv4 is described in IETF publication RFC 791 (September 1981), replacing an earlier definition (RFC 760, January 1980). IPv6 refers to using signal packets substantially compatible or substantially compliant with Internet Protocol version 6, also referred to as IPv6 signal packets. IPv6 is described in IETF publication RFC 2460, published in December 1998. Gateway device 511 in an embodiment, for example, may communicate using IPv4 signal packets or IPv6 signal packets. It is noted, of course, that claimed subject matter is not limited in scope to IPv4 and/or IPv6 signal packets. Any one of a host of known or to be developed signal packets may be employed. Nonetheless, in this illustrative example, communications between gateway device 511 and tunnel server 560 may, for example, comprise IPv6 signal packets. Communications between gateway device 511 and network device 512 may, for example, comprise IPv4 signal packets.

In an embodiment, gateway device 511, for example, may assign IPv6 addresses to IPv4 network devices communicating as part of non-virtual broadcast domain 510, without transmitting the IPv6 addresses to the IPv4 devices. In this embodiment, network device 512 may communicate using IPv4 signal packets whereas file server 520 may communicate using IPv6 signal packets. For example, network device 512 may request services from file server 520. In an embodiment, gateway device 511 may translate IPv4 signal packets from network device 512 to IPv6 signal packets to be forwarded via tunnel server 560 to file server 520. Response signal packets transmitted to gateway device 511 may be translated from IPv6 signal packets to IPv4 signal packets, such that they may be readily understood and/or processed by network device 512, communicating using IPv4 signal packets. In this context, a gateway device may, for example, perform translate services so that devices of a logical broadcast domain that communicate using IPv4 signal packets may be able to communicate with devices of a logical broadcast domain that communicate using IPv6 signal packets, for example. In another embodiment, tunnel server 560 may provide translation between IPv4 and IPv6 signal packets, such that gateway device 511 communicates using IPv4 signal packets without necessarily performing translation.

In one embodiment, gateway device 515, may assign IPv6 addresses to other devices communicating as part of virtual broadcast domain 514, such as, network device 516, file server 520, or virtual device 522, in addition to already assigned IPv4 addresses. Gateway device 515 may also provide updated routing tables to other devices communicating as part of virtual broadcast domain 514, such as, network device 516, file server 520, or virtual device 522.

In another embodiment, linking with another logical broadcast domain may result in a multi-layered collection or nesting of logical broadcast domains. For example, in one embodiment, a virtual broadcast domain 580 may comprise virtual broadcast domain 514 and non-virtual broadcast domain 510, linked as previously discussed. Gateway device 515 may generate and forward a broadcast domain configuration to controller 506. Gateway device 515, may also forward signal packets, or derivatives thereof, from devices communicating as part of virtual broadcast domain 514, to tunnel server 560.

Virtual broadcast domain 590 may comprise linking virtual broadcast domain 580 and non-virtual broadcast domain 509. Gateway device 515, operating as a gateway device for virtual broadcast domain 580, may transmit a broadcast domain configuration for virtual broadcast domain 580 to master controller 507. Master controller 507 may request and/or receive a broadcast domain configuration from another controller, such as controller 506, for example. In an embodiment, therefore, gateway device 515 may in effect concurrently operate as a gateway device for different virtual broadcast domains. Of course, as previously described, an alternate approach may employ signal packet transmissions between tunnel servers, such as between 560 and 561 of FIG. 5.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also stores a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, or other identifiers. In other embodiments, a communication network may be embodied as a wired network, wireless network, or combination thereof.

A network device may vary in terms of capabilities or features. Claimed subject matter is intended to cover a wide range of potential variations. For example, a network device may include a numeric keypad or a display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, or a display with a higher degree of functionality, such as a touch-sensitive color 2D or 3D display, for example.

A network device may include or may execute a variety now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A network device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A logical broadcast domain may also be extended to another device communicating as part of another network, such as via a virtual private network (VPN). To support a VPN, logical broadcast domain transmissions may be forwarded to the VPN device via another network. For example, a software tunnel may be created between the logical broadcast domain, and the VPN device. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A logical broadcast domain may communicate via signal packets, such as in a network of participating digital communications, A logical broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A logical broadcast domain may employ, for example, TCP/IP, UDP, DECnet, NetBEUI, IPX, Appletalk, other, or the like. Versions of the Internet Protocol (IP) may include IPv4 or IPv6, or other, or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, and/or characteristic in the singular and/or may be used to describe a plurality or some other combination of features, structures and/or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of communicating between a first network device of a first logical broadcast domain (LBD) and a second network device of a second LBD, the method comprising:
generating, by a first gateway device of the first LBD, a first broadcast domain configuration of the first LBD;
transmitting, by the first gateway device, the first broadcast domain configuration to a controller;
generating, by a second gateway device of the second LBD, a second broadcast domain configuration of the second LBD;
transmitting, by the second gateway device, the second broadcast domain configuration to the controller, wherein the controller is external to the first and the second LBDs;
transmitting, by the controller, the first broadcast domain configuration to the second gateway device and the second broadcast domain configuration to the first gateway device;
provisioning, by the controller, a tunnel server to communicate between the first and the second gateway devices, wherein the tunnel server is external to the first and the second LBDs;
transmitting, by the controller, at least one address of the tunnel server to the first and the second gateway devices;
transmitting, by the first network device, signal packets to the first gateway device, wherein the first gateway device of the first LBD emulates the second network device of the second LBD;
encapsulating, by the first gateway device, the signal packets, wherein the encapsulated signal packets include the at least one address of the tunnel server;
transmitting, by the first gateway device, the encapsulated signal packets to a first router;
transmitting, by the first router, the encapsulated signal packets to the tunnel server while bypassing network address translation of the encapsulated signal packets that would otherwise occur by the first router without the encapsulation;
by the tunnel server, terminating encapsulation of the encapsulated signal packets, re-encapsulating the signal packets, and forwarding the re-encapsulated signal packets to a second router;
transmitting, by the second router, the re-encapsulated signal packets to the second gateway device of the second LBD while bypassing network address translation of the re-encapsulated signal packets that would otherwise occur by the second router without the re-encapsulation;
by the second gateway device, terminating encapsulation of the re-encapsulated signal packets to provided modified signal packets and forwarding the modified signal packets to the second network device of the second LBD, wherein the second gateway device emulates the first network device of the first LBD.

2. The method of claim 1, wherein the first gateway device emulates the second network device, so that the first network device of the first LBD does not recognize that the signal packets are to be forwarded to the tunnel server or to the second LBD.

3. The method of claim 2, wherein the first gateway device communicates with the first network device of the first LBD according to a IPv4 protocol,
wherein the second gateway device communicates with the second network device of the second LBD according to a IPv6 protocol,
wherein the first gateway device emulating the second network device includes associating an IPv4 address and an IPv6 address with the second network device, and wherein the IPv6 address is not transmitted to the first network device.

4. The method of claim 1, wherein the first gateway device communicates with the first network device of the first LBD according to a first network protocol, and wherein the second gateway device communicates with the second network device of the second LBD according to a second network protocol inconsistent with the first network protocol.

5. The method of claim 1, wherein the first gateway device communicates with the first network device of the first LBD according to a IPv4 protocol, wherein the second gateway device communicates with the second network device of the second LBD according to a IPv6 protocol, and wherein the encapsulating by the first gateway device of the signal packets includes translating the signal packets to the IPv6 protocol.

6. The method of claim 1, wherein the first gateway device and the first network device of the first LBD occupy a first private address space,
wherein the second gateway device and the second network device of the second LBD occupy a second private address space different than the first, private address space,
wherein the tunnel server and the controller occupy a public address space,
wherein the first router is capable of translating addresses between the first private address space and the public address space in accordance with network address translation, and
wherein the second router is capable of translating addresses between the second private address space and the public address space in accordance with network address translation.

7. The method of claim 1, wherein the encapsulating by the first gateway device of the signal packets includes, for the signal packets, at least one of the following: encrypting, compressing, modifying, filtering, digesting, or any combination thereof.

8. The method of claim 1, wherein the controller and the tunnel server comprise a single physical device.

9. The method of claim 1, further comprising:
by the tunnel server, after the terminating the encapsulation of the encapsulated signal packets, scanning the signal packets for any one or more of the following: virus detection, adware detection, malware detection, for forensics, for logging purposes, for communications patterns, or for assessing compliance with rules, or for any combination thereof.

10. The method of claim 1, wherein the first router includes a routing table configured to map signal packets intended to reach the second LBD for delivery to the tunnel server, and wherein the transmitting the encapsulated signal packets from the first router includes referring by the first router to the routing table and forwarding the encapsulated signal packets in accordance with the routing table to the tunnel server while bypassing network address translation.

11. A system for use with a first router, a second router, a first logical broadcast domain (LBD) having a first broadcast domain configuration, and a second LBD having a second broadcast domain configuration, wherein the first LBD includes a first network device and a first gateway device, and wherein the second LBD includes a second network device and a second gateway device, the system comprising:
a controller external to the first and the second LBDs; and
a tunnel server external to the first and the second LBDs,
wherein the first gateway device to generate the first broadcast domain configuration of the first LBD,
wherein the first gateway device to transmit the first broadcast domain configuration to the controller,
wherein the second gateway device to generate the second broadcast domain configuration of the second LBD,
wherein the second gateway device to transmit the second broadcast domain configuration to the controller,
wherein the controller to transmit the first broadcast domain configuration to the second gateway device and the second broadcast domain configuration to the first gateway device,
wherein the controller to provision the tunnel server to communicate between the first and the second gateway devices,
wherein the controller to transmit at least one address of the tunnel server to the first and the second gateway devices;
wherein the first network device to transmit signal packets to the first gateway device, wherein the first gateway device of the first LBD to emulate the second network device of the second LBD,
wherein the first gateway device to encapsulate the signal packets, wherein the encapsulated signal packets include the at least one address of the tunnel server,
wherein the first gateway device to transmit the encapsulated signal packets to the first router,
wherein the first router to transmit the encapsulated signal packets to the tunnel server while bypassing network address translation of the encapsulated signal packets that would otherwise occur by the first router without the encapsulation,
wherein the tunnel server to terminate encapsulation of the encapsulated signal packets, to re-encapsulate the signal packets, and to forward the re-encapsulated signal packets to the second router,
wherein the second router to transmit the re-encapsulated signal packets to the second gateway device of the second LBD while bypassing network address translation of the re-encapsulated signal packets that would otherwise occur by the second router without the re-encapsulation, and
wherein the second gateway device to terminate encapsulation of the re-encapsulated signal packets to provided modified signal packets and to forward the modified signal packets to the second network device of the second LBD, wherein the second gateway device to emulate the first network device of the first LBD.

12. The system of claim 11, wherein the first gateway device to emulate the second network device, so that the first network device of the first LBD does not recognize that the signal packets are to be forwarded to the tunnel server or to the second LBD.

13. The system of claim 12, wherein the first gateway device to communicate with the first network device of the first LBD according to a IPv4 protocol,
wherein the second gateway device to communicate with the second network device of the second LBD according to a IPv6 protocol,
wherein the first gateway device to emulate the second network device includes to associate an IPv4 address and an IPv6 address with the second network device, and to not transmit the IPv6 address to the first network device.

14. The system of claim 11, wherein the first gateway device to communicate with the first network device of the first LBD according to a first network protocol, and wherein the second gateway device to communicate with the second network device of the second LBD according to a second network protocol inconsistent with the first network protocol.

15. The system of claim 11, wherein the first gateway device to communicate with the first network device of the first LBD according to a IPv4 protocol, wherein the second gateway device to communicate with the second network device of the second LBD according to a IPv6 protocol, and wherein the first gateway device to encapsulate the signal packets includes to translate the signal packets to the IPv6 protocol.

16. The system of claim 11, wherein the first gateway device and the first network device of the first LBD occupy a first private address space,
wherein the second gateway device and the second network device of the second LBD occupy a second private address space different than the first, private address space,
wherein the tunnel server and the controller occupy a public address space,
wherein the first router is capable of translating addresses between the first private address space and the public address space in accordance with network address translation, and
wherein the second router is capable of translating addresses between the second private address space and the public address space in accordance with network address translation.

17. The system of claim 11, wherein the first gateway device to encapsulate the signal packets includes, for the signal packets, at least one of the following: to encrypt, to compress, to modify, to filter, to digesting, or any combination thereof.

18. The system of claim 11, wherein the controller and the tunnel server comprise a single physical device.

19. The system of claim 11, wherein the tunnel server further to scan the signal packets for any one or more of the following: virus detection, adware detection, malware detection, for forensics, for logging purposes, for communications patterns, or for assessing compliance with rules, or for any combination thereof.

20. The system of claim 11, wherein the first router includes a routing table configured to map signal packets intended to reach the second LBD for delivery to the tunnel server, and wherein the first router to transmit the encapsulated signal packets includes to refer to the routing table and to forward the encapsulated signal packets in accordance with the routing table to the tunnel server while bypassing network address translation.

21. An article for use with a first router, a second router, a tunnel server, a first logical broadcast domain (LBD) having a first broadcast domain configuration, and a second LBD having a second broadcast domain configuration, wherein the first LBD includes a first network device and a first gateway device, and wherein the second LBD includes a second network device and a second gateway device, the article comprising a non-transitory storage medium having stored thereon instructions executable by a controller external to the first and the second LBDs, and wherein the instructions are executable by the controller to:
  receive from the first gateway device the first broadcast domain configuration as generated by the first gateway device;
  receive from the second gateway device the second broadcast domain configuration as generated by the second gateway device;
  transmit the first broadcast domain configuration to the second gateway device and the second broadcast domain configuration to the first gateway device;
  provision the tunnel server to communicate between the first and the second gateway devices; and
  transmit at least one address of the tunnel server to the first and the second gateway devices,
    wherein the first network device to transmit signal packets to the first gateway device, wherein the first gateway device of the first LBD to emulate the second network device of the second LBD,
    wherein the first gateway device to encapsulate the signal packets, wherein the encapsulated signal packets include the at least one address of the tunnel server,
    wherein the first gateway device to transmit the encapsulated signal packets to the first router,
    wherein the first router to transmit the encapsulated signal packets to the tunnel server while bypassing network address translation of the encapsulated signal packets that would otherwise occur by the first router without the encapsulation,
    wherein the tunnel server to terminate encapsulation of the encapsulated signal packets, to re-encapsulate the signal packets, and to forward the re-encapsulated signal packets to the second router,
    wherein the second router to transmit the re-encapsulated signal packets to the second gateway device of the second LBD while bypassing network address translation of the re-encapsulated signal packets that would otherwise occur by the second router without the re-encapsulation, and
    wherein the second gateway device to terminate encapsulation of the re-encapsulated signal packets to provided modified signal packets and to forward the modified signal packets to the second network device of the second LBD, wherein the second gateway device to emulate the first network device of the first LBD.

22. The article of claim 21, wherein the first gateway device to emulate the second network device, so that the first network device of the first LBD does not recognize that the signal packets are to be forwarded to the tunnel server or to the second LBD.

23. The article of claim 22, wherein the first gateway device to communicate with the first network device of the first LBD according to a IPv4 protocol,
  wherein the second gateway device to communicate with the second network device of the second LBD according to a IPv6 protocol,
  wherein the first gateway device to emulate the second network device includes to associate an IPv4 address and an IPv6 address with the second network device, and to not transmit the IPv6 address to the first network device.

24. The article of claim 21, wherein the first gateway device to communicate with the first network device of the first LBD according to a first network protocol, and wherein the second gateway device to communicate with the second network device of the second LBD according to a second network protocol inconsistent with the first network protocol.

25. The article of claim 21, wherein the first gateway device to communicate with the first network device of the first LBD according to a IPv4 protocol, wherein the second gateway device to communicate with the second network device of the second LBD according to a IPv6 protocol, and wherein the first gateway device to encapsulate the signal packets includes to translate the signal packets to the IPv6 protocol.

26. The article of claim 21, wherein the first gateway device and the first network device of the first LBD occupy a first private address space,
  wherein the second gateway device and the second network device of the second LBD occupy a second private address space different than the first private address space,
  wherein the tunnel server and the controller occupy a public address space,
  wherein the first router is capable of translating addresses between the first private address space and the public address space in accordance with network address translation, and
  wherein the second router is capable of translating addresses between the second private address space and the public address space in accordance with network address translation.

27. The article of claim 21, wherein the first gateway device to encapsulate the signal packets includes, for the signal packets, at least one of the following: to encrypt, to compress, to modify, to filter, to digesting, or any combination thereof.

28. The article of claim 21, wherein the controller and the tunnel server comprise a single physical device.

29. The article of claim 21, wherein the tunnel server further to scan the signal packets for any one or more of the following: virus detection, adware detection, malware detection, for forensics, for logging purposes, for communications patterns, or for assessing compliance with rules, or for any combination thereof.

30. The article of claim 21, wherein the first router includes a routing table configured to map signal packets intended to reach the second LBD for delivery to the tunnel server, and wherein the first router to transmit the encapsulated signal packets includes to refer to the routing table and to forward the encapsulated signal packets in accordance with the routing table to the tunnel server while bypassing network address translation.

* * * * *